(12) United States Patent
Sachin Gopal et al.

(10) Patent No.: US 12,711,262 B1
(45) Date of Patent: Aug. 18, 2026

(54) MANAGEMENT OF COMPUTATIONAL ENTERPRISE ENVIRONMENT WITH PLATFORM FOR GENERATING AND UTILIZING SANDBOXES

(71) Applicant: People Center, Inc., San Francisco, CA (US)

(72) Inventors: Fnu Sachin Gopal, San Francisco, CA (US); Nikunj Aggarwal, Secaucas, NJ (US); Nitin Aggarwal, San Francisco, CA (US); Kyle Boston, San Francisco, CA (US); Varshini Kumar, New York, NY (US); Munira Godman Rahemtulla, Seattle, WA (US); Jingru Guo, San Francisco, CA (US); Murray Leo Spork, San Francisco, CA (US); Amit Parikh, Foster City, CA (US); Rupank Bansal, San Francisco, CA (US); Chi Zhang, Palo Alto, CA (US)

(73) Assignee: People Center, Inc., San Francisco, CA (US)

(*) Notice: Subject to any disclaimer, the term of this patent is extended or adjusted under 35 U.S.C. 154(b) by 0 days.

(21) Appl. No.: 19/311,934

(22) Filed: Aug. 27, 2025

(51) Int. Cl.
*G06F 21/53* (2013.01)
*G06F 21/62* (2013.01)

(52) U.S. Cl.
CPC .......... *G06F 21/6218* (2013.01); *G06F 21/53* (2013.01)

(58) Field of Classification Search
CPC ............................ G06F 21/6218; G06F 21/53
See application file for complete search history.

(56) References Cited

U.S. PATENT DOCUMENTS 12,153,698 B2 * 11/2024 Carru .................... G06F 21/629
2002/0116549 A1 * 8/2002 Raffaele .................. G06F 9/468 719/330
2006/0080316 A1 * 4/2006 Gilmore .............. G06F 21/6218 707/999.009
2006/0230282 A1 * 10/2006 Hausler ............... G06F 21/6218 713/182
2009/0216768 A1 * 8/2009 Zwilling ................. G06F 16/25 707/999.009
2015/0150006 A1 * 5/2015 Fitzgerald ............... G06F 21/53 718/1
2015/0199510 A1 * 7/2015 Krstic ..................... H04L 63/10 713/189
2015/0347746 A1 * 12/2015 Martel ................ G06F 21/6218 726/1
2016/0371495 A1 * 12/2016 Bhat ..................... G06F 21/445
2017/0111365 A1 * 4/2017 Michael .................. G06F 9/545
(Continued)

*Primary Examiner* — Nasser M Goodarzi
(74) *Attorney, Agent, or Firm* — Dority & Manning, P.A.

(57) ABSTRACT

Systems, devices, computer-implemented methods, and tangible non-transitory computer readable media for developing and executing sandboxes with instances that perform complex, multi-step workflows for large-scale workforce management systems. For example, a computing device may control communications and operations associated with the sandboxes to avoid interference from the sandboxes with one another. The computing device can manage login-as content associated with corresponding sandbox instances being generated therewith. The sandboxes can be managed utilizing different states controlled by state machines for various types of operations associated with the sandboxes.

20 Claims, 12 Drawing Sheets

(56) References Cited

U.S. PATENT DOCUMENTS

| | | | | |
|---|---|---|---|---|
| 2018/0181451 | A1 * | 6/2018 | Saxena | G06F 21/629 |
| 2021/0042210 | A1 * | 2/2021 | Chang | G06F 11/3688 |
| 2021/0173918 | A1 * | 6/2021 | Khurana | G06F 21/53 |
| 2022/0179986 | A1 * | 6/2022 | Veeramachaneni | G06F 3/0622 |
| 2022/0188436 | A1 * | 6/2022 | Mika | G06F 21/31 |
| 2023/0222205 | A1 * | 7/2023 | Nambannor Kunnath | G06F 21/45 726/6 |
| 2023/0403306 | A1 * | 12/2023 | Chen | H04L 63/102 |
| 2024/0035430 | A1 * | 2/2024 | Guo | F02M 7/18 |
| 2024/0330430 | A1 * | 10/2024 | Chintala | G06F 21/44 |
| 2024/0364744 | A1 * | 10/2024 | Baker | H04L 63/0272 |
| 2025/0086268 | A1 * | 3/2025 | Rath | G06F 21/53 |
| 2025/0094613 | A1 * | 3/2025 | Wang | G06Q 30/0631 |
| 2025/0252196 | A1 * | 8/2025 | Dhoble | G06F 21/82 |
| 2025/0286895 | A1 * | 9/2025 | Sleeman | H04L 63/105 |

* cited by examiner

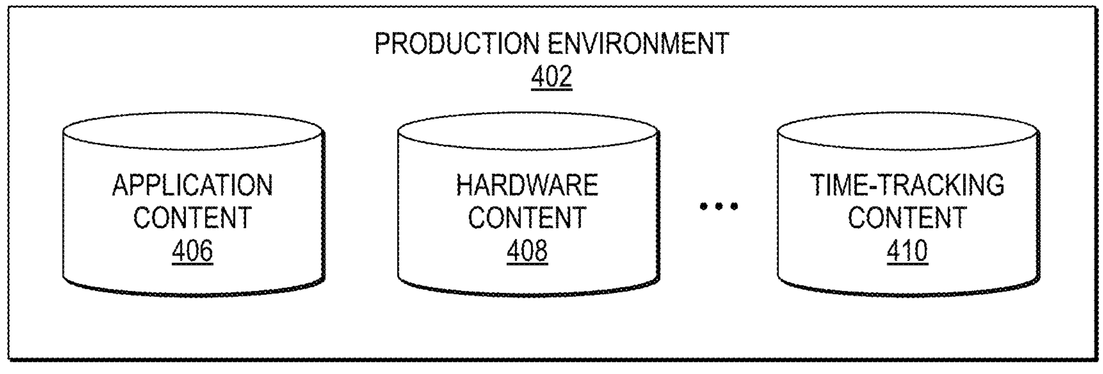
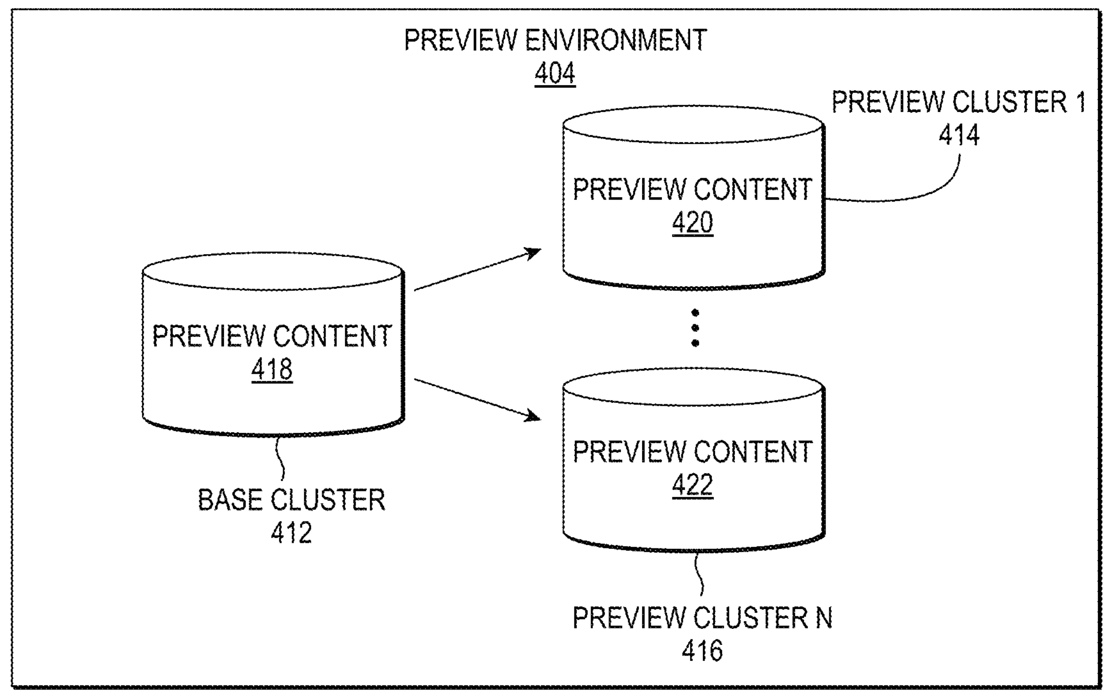
FIG. 4

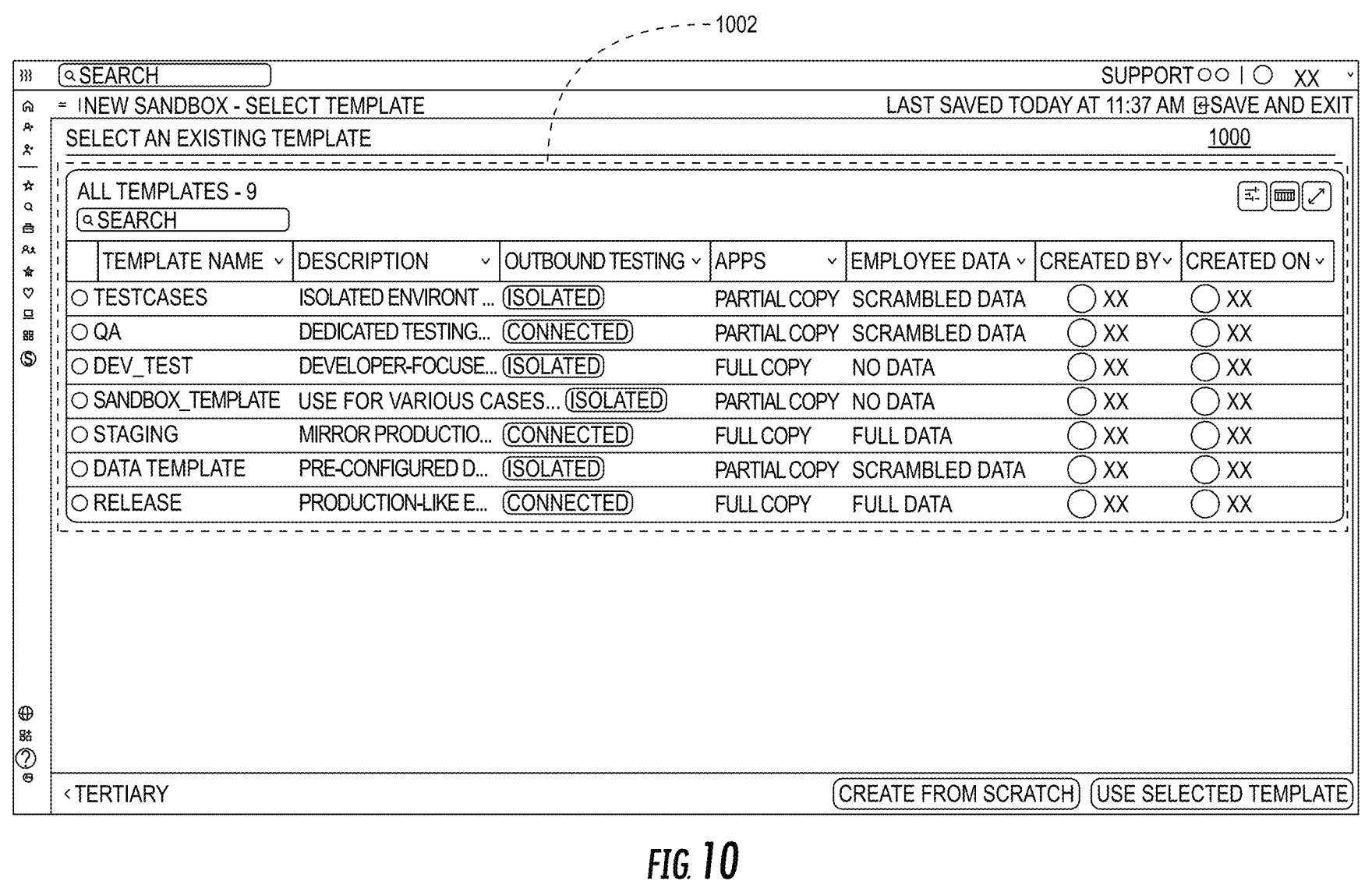

| TEMPLATE NAME | DESCRIPTION | OUTBOUND TESTING | APPS | EMPLOYEE DATA | CREATED BY | CREATED ON |
|---|---|---|---|---|---|---|
| TESTCASES | ISOLATED ENVIRONT ... | ISOLATED | PARTIAL COPY | SCRAMBLED DATA | XX | XX |
| QA | DEDICATED TESTING... | CONNECTED | PARTIAL COPY | SCRAMBLED DATA | XX | XX |
| DEV_TEST | DEVELOPER-FOCUSE... | ISOLATED | FULL COPY | NO DATA | XX | XX |
| SANDBOX_TEMPLATE | USE FOR VARIOUS CASES... | ISOLATED | PARTIAL COPY | NO DATA | XX | XX |
| STAGING | MIRROR PRODUCTIO... | CONNECTED | FULL COPY | FULL DATA | XX | XX |
| DATA TEMPLATE | PRE-CONFIGURED D... | ISOLATED | PARTIAL COPY | SCRAMBLED DATA | XX | XX |
| RELEASE | PRODUCTION-LIKE E... | CONNECTED | FULL COPY | FULL DATA | XX | XX |

FIG. 10

MANAGEMENT OF COMPUTATIONAL ENTERPRISE ENVIRONMENT WITH PLATFORM FOR GENERATING AND UTILIZING SANDBOXES

FIELD

The present disclosure generally relates to computational enterprise environments with platforms for generating and utilizing sandboxes. More particularly, the present disclosure relates to development and execution of sandboxes with instances that perform complex, multi-step workflows for large-scale workforce management systems being tested, deployed, and maintained thereby.

BACKGROUND

In the field of enterprise software, various computational platforms are used by organizations to manage various organizational operations. Configurations of production versions of the platforms are modified, updated, and added to the platforms. Various types of platforms utilized by organizations for workforce management enable the organizations to perform various operations associated with members of the organizations. The platforms are utilized to track content associated with various types of members with functions and roles within the organizations.

Sandboxes generated for workforce management systems enable various types of members of the organizations to test the platforms with which the members interact. Individuals, including administrators, and/or members of the organizations, perform different types of tests utilizing the sandboxes. The organizations include various kinds of members that control the platforms to perform different types of operations, including tests performed with the sandboxes. The members include supervisors, employees, and any other types of members having different roles within the organizations.

SUMMARY

Aspects and advantages of embodiments of the present disclosure will be set forth in part in the following description, or can be learned from the description, or can be learned through practice of the embodiments.

According to an example embodiment of the present disclosure, a computing system can include one or more processors. The system can also include a data store storing one or more logical databases with user data. The computing system can further include one or more memory devices that can store instructions that, when executed by the one or more processors, can cause the computing system to perform operations. The operations can include establishing a sandbox of a workforce management platform and a logical database for a sandbox instance of the sandbox. The operations can include managing objects in the logical database of the sandbox using metadata associated with a corresponding cluster. The logical database can isolate the sandbox from one or more other sandboxes. The operations can include managing permissioned access to the objects, based on relative assignments of users in an organization. The operations can include generating and executing the sandbox instance of the sandbox using the managed objects and the managed permissioned access. The operations can include performing an action using the sandbox instance based on a command and a user profile of a user of the organization, the command being associated with the user and provided based on customer input from a customer.

According to another example embodiment of the present disclosure, a computer-implemented method can include establishing a sandbox of a workforce management platform and a logical database for a sandbox instance of the sandbox; managing objects in the logical database of the sandbox using metadata associated with a corresponding cluster. The logical database can isolate the sandbox from one or more other sandboxes; managing permissioned access to the objects, based on relative assignments of users in an organization; generating and executing the sandbox instance of the sandbox using the managed objects and the managed permissioned access; and performing an action using the sandbox instance based on a command and a user profile of a user of the organization, the command being associated with the user and provided based on customer input from a customer.

According to another example embodiment of the present disclosure, one or more tangible non-transitory computer-readable media configured to generate multiple sandbox instances per individual customer can store non-transitory computer-readable instructions that, when executed by one or more processors, can cause the one or more processors to perform operations. The operations can include establishing a sandbox of a workforce management platform and a logical database for a sandbox instance of the sandbox. The operations can include managing objects in the logical database of the sandbox using metadata associated with a corresponding cluster. The logical database can isolate the sandbox from one or more other sandboxes. The operations can include managing permissioned access to the objects, based on relative assignments of users in an organization. The operations can include generating and executing the sandbox instance of the sandbox using the managed objects and the managed permissioned access. The operations can include performing an action using the sandbox instance based on a command and a user profile of a user of the organization, the command being associated with the user and provided based on customer input from a customer.

Other embodiments of the present disclosure are directed to various systems, apparatuses, non-transitory computer-readable media, computer-implemented methods, entity interfaces, and/or devices that can facilitate development and execution of sandboxes with instances that perform complex, multi-step workflows for large-scale workforce management systems being tested, deployed, and maintained thereby.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 4 depicts a block diagram of production and preview environments for managing sandboxes with computing systems that develop and execute the sandboxes for large-scale workforce management platforms, according to example embodiments of the present disclosure.

FIG. 10 depicts a screenshot utilized to control sandbox templates, according to example embodiments of the present disclosure.

Figure 1:
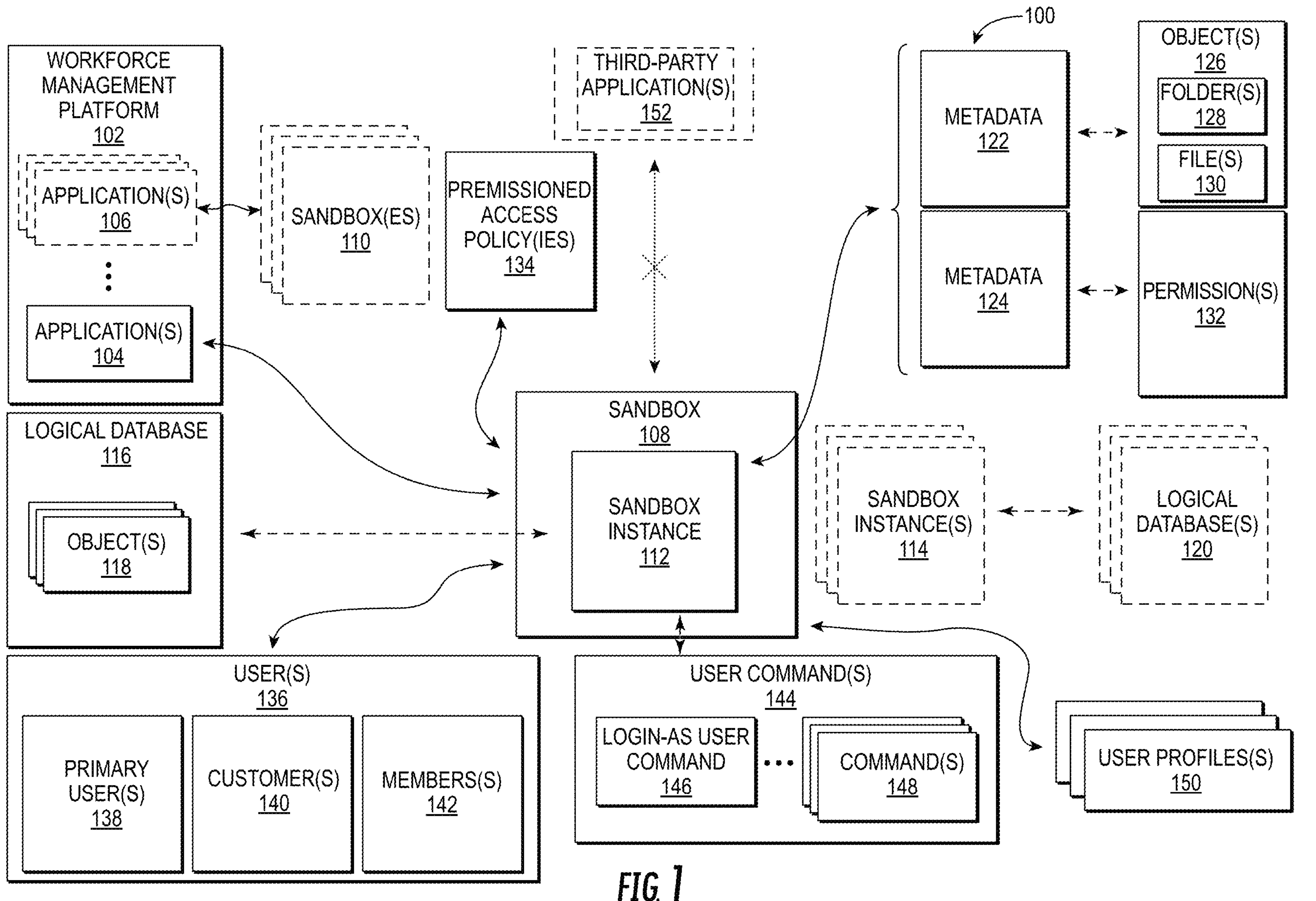
FIG. 1 depicts a block diagram of an example environment for managing sandboxes utilized to perform complex, multi-step workflows for large-scale workforce management platforms being tested, deployed, and maintained thereby, according to example embodiments of the present disclosure.

Reference numerals that are repeated across plural figures are intended to identify the same features in various implementations.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a further embodiment. Thus, it is intended that aspects of the present disclosure cover such modifications and variations.

Generally, the present disclosure is directed to providing improved computer applications, computer systems, computer-implemented methods, user interfaces, and/or services for testing, deploying, and maintaining large-scale workforce management systems. The workforce management systems can include various computing systems utilized to develop and execute sandboxes. The sandboxes can include instances that perform complex, multi-step workflows for the workforce management systems. The workforce management systems can control communications and operations associated with the sandboxes to avoid interference from the sandboxes with one another. The workforce management systems can manage login-as content associated with corresponding sandbox instances being generated therewith. The sandboxes can be managed utilizing different states controlled by state machines for various types of operations associated with the sandboxes.

Multiple sandboxes for platforms of individual workforce management systems of individual organizations can be managed. Data associated with corresponding sandboxes can be cloned and utilized to test workforce management systems. Snapshots of all data associated with individual companies can be taken and utilized by corresponding sandboxes. The sandboxes can include current up-to-date data to ensure accurate results of tests performed with the sandboxes. The platforms manage content that is associated with organizations and that includes the data captured by the snapshots. The organization content may be associated with administrators and/or various members of the organizations.

The sandboxes can replicate aspects of computing environments in isolation with respect to other portions of the computing environments. The sandboxes can be isolated from one another to prevent occurrences of undesirable effects from operations performed using the sandboxes. Isolating the sandboxes can include logically isolating corresponding databases associated with the sandboxes. Data can be captured and flattened into logical databases to help promote data integrity and prevent cross-contamination between test environments. Routing of certain types of network traffic between the sandbox instances and other portions of the computing environments can be blocked utilizing network proxies.

Login-as content provided by individuals requesting access to the sandbox instances can be utilized to manage the sandbox instances. Corresponding content associated with the individuals can be provided by the sandbox instances for testing the platforms with the corresponding content. The corresponding content associated with the individuals can be managed by the platforms utilizing corresponding permissions associated with the individuals. The login-as content and the corresponding permissions can be utilized to control execution of corresponding operations enabled for the individuals in the sandbox instances. The login-as content and the corresponding permissions can be utilized to control availability of corresponding data to which the individuals have access in the sandbox instances.

Various states can be utilized to control various types of operation for the sandbox instances. States can be utilized to set up and execute the sandbox instances. States utilized to set up the sandbox instances can include provisioning states, provisioning failed states, and provisioned empty states. States utilized to set up the sandbox instances can include resetting states, rest failed states, restoring states, and restore failed states. States utilized to execute the sandbox instances can include ready states. Corresponding state machines associated with the sandbox instances can be utilized to control the sandbox instances to be executed in, or to transition between, the various states. The platforms can utilize the state machines, and the states associated therewith, to control the sandbox instances to execute consistent and reliable processes with up-to-date production data.

The systems, methods, and computer program products described herein provide a number of technical effects and benefits. As one example, the embodiments described in the present disclosure provide automated generation and processing of computer instructions for use across a variety of applications and systems that utilize different underlying technologies and technical designs, for example, more efficiently and with fewer computing resources (e.g., less processing power, less memory usage, less power consumption, etc.), that would otherwise be wasted by maintaining custom, proprietary, and/or manual processes. In particular, examples of the present disclosure automate the generation and processing of computer instructions across different applications and systems using a rigorous computerized process.

With reference to the Figures, example embodiments of the present disclosure will be discussed in further detail.

FIG. 1 depicts a block diagram of an example computing environment 100 for managing sandboxes utilized to perform complex, multi-step workflows for large-scale workforce management platforms being tested, deployed, and maintained thereby, according to example embodiments of the present disclosure. The computing environment (or "environment") 100 includes a workforce management platform (also referred to herein simply as "platform") 102. The platform 102, and/or one or more computing devices therein, can be utilized to manage various types and/or amounts of content. In some examples, the platform 102, any content managed by the platform 102, any content associated with operation of the platform 102, or any combination thereof, can be included in, and/or implemented as a part of one or more enterprise environments (e.g., one or more enterprise production software as a service (SaaS) environments).

The content managed by the platform 102 can include various applications, such as an application 104 and one or more applications 106. The application 104 may represent any type of content, such as one or more programs, one or more applications, one or more portions of software, one or more software programs, etc., or any other type of content. Individual ones of the application(s) 106 can be implemented and/or utilized in a similar manner as the application 104.

The platform 102, and/or the computing device(s) therein, can be communicatively coupled with one or more systems that manage and/or utilize various types and/or amounts of content associated with sandboxes. Alternatively or additionally, the platform 102, and/or the computing device(s) therein, can manage and/or utilize any of the sandbox content, or any combination thereof. In some cases, the platform 102 may represent one or more enterprise-grade sandbox platforms utilized to replicate one or more live SaaS environments (e.g., one or more portions of software, such as the application 104 and/or the application(s) 106, which can be included as the SaaS environment(s), can include software in the SaaS environment(s), can be included within software in the SaaS environment(s), or any combination thereof) in one or more isolated preview instances. By replicating the live SaaS environment(s), the platform 102 can be utilized to replicate realistic testing of one or more configurations, one or more integrations, and/or one or more changes to the SaaS environment(s) without impacting production operations.

The content associated with the platform 102 can include various numbers of sandboxes (also referred to herein simply as "sandboxes"), such as a sandbox 108 and/or one or more sandboxes 110. The sandbox 108 may represent various types and/or amounts of content associated with any of the application 104, the application(s) 106, and/or any other workforce content. Individual ones of the sandboxes(s) 110 can be implemented and/or utilized in a similar manner as the sandbox 108.

The sandbox 108 may be associated with an application (e.g., the application 104). In some examples, the sandbox 108 can be associated with the application 104, as represented by the arrow depicted between the application 104 and the sandbox 108 in FIG. 1. In some examples, individual ones of the sandbox(es) 110 respectively can be associated with different applications from one another, such as corresponding applications from among the application(s) 106.

The sandbox 108 can be utilized to manage content associated with a sandbox instance. The sandbox instance content can be associated with various types and/or numbers of sandbox instances, such as a sandbox instance 112. The sandbox instance 112 may represent any type of sandbox instance content. Individual ones of the sandbox instance(s) 114 can be implemented and/or utilized in a similar manner as the sandbox instance 112. The sandbox(s) 110 can be utilized to manage content associated with one or more sandbox instances 114, in a similar way as for the sandbox 108 and the sandbox instance 112, respectively.

The sandboxes and/or the sandbox instances can be isolated from other sandboxes and/or sandbox instances, respectively. The sandbox 108 can be isolated from individual ones of the sandbox(es) 110. The sandbox instance 112 (e.g., in the sandbox 108) can be isolated from individual ones of the sandbox instance(s) 114.

The environment 100 can include storage devices to store data utilized by the sandboxes. For example, the storage devices can include various types and/or numbers of databases, which can be logically isolated from one another. The databases can include a logical database 116, which can be utilized to manage one or more objects 118. The object(s) 118 can include one or more files of any type, one or more documents of any type, one or more folders of any type, one or more other objects, or any combination thereof. The object(s) 118 can be included in, and/or utilized by, the sandbox 108. The databases can include one or more logical databases 120. Individual ones of the logical database(s) 120 can be implemented and/or utilized in a similar manner as the logical databases 116.

The environment 100 can include various types and/or amounts of metadata, such as individual portions of metadata associated with corresponding sandboxes (e.g., the sandbox 108). In some examples, the metadata can include one or more portions of metadata (e.g., associated with one or more objects), such as metadata 122. The metadata 122 may be associated with one or more objects 126, which can include one or more folders 128, one or more files 130, and/or one or more various types of other objects. In some examples, the metadata can include one or more portions of metadata (e.g., associated with one or more permissions), such as metadata 124. In some examples, the metadata 122, the metadata 124, the object(s) 126, and/or the permission(s) 132 may be associated with a single sandbox, such as the sandbox 108. In those or other examples, more particularly, the metadata 122, the metadata 124, the object(s) 126, and/or the permission(s) 132 may be associated with a single sandbox instance, such as the sandbox instance 112, as represented by the arrow depicted between the metadata 122/124 and the sandbox instance 112 in FIG. 1.

The environment 100 can include various types and/or numbers of permissioned access policies associated with various types and/or numbers of users. In some instances, the permissioned access policies can include one or more permissioned access policies 134. The permissioned access policy(ies) 134 may be associated with a single sandbox, such as the sandbox 108, as represented by the arrow depicted between the permissioned access policy(ies) 134 and the sandbox 108 in FIG. 1. In those or other instances, the users can include one or more users 136. The user(s) 136 can include one or more primary users 138, one or more customers 140, one or more members 142, and/or one or more other users of various types. Permissioned access to the object(s) 118 can be controlled using the sandbox instance 112. The access can be controlled based on relative assignments of the user(s) 136. One or more permissions associated with individual users of the user(s) 136 can be managed via individual profiles of the user(s) 136, in some instances.

In some examples, the user(s) 136 may be associated with a single sandbox, such as the sandbox 108, as represented by the arrow depicted between the user(s) 136 and the sandbox 108 in FIG. 1. In those or other examples, a single user from among the user(s) 136 may be associated with a single sandbox instance, such as the sandbox instance 112. The user 136, for example, may utilize the sandbox instance 112 to test the workforce management platform 102 and/or the application 104.

Individual ones of the permissioned access policy(ies) 134 may be associated with corresponding users from among the user(s) 136. In various cases, a single policy from among the permissioned access policy(ies) 134 can include a group of one or more permission(s). The group of permission(s) in the permissioned access policy 134 can include the permission(s) 132. The permissioned access policy 134, and/or the permission(s) 132 in the permissioned access policy 134, may be associated with the single user from among the user(s) 136. In some cases, the user 136 may utilize the sandbox instance 112 based on the metadata 122, the metadata 124, the object(s) 126, the permission(s) 132, or any combination thereof.

The environment 100 can include one or more user commands 144. The user command(s) 144 can include a login-as user command 146, and/or one or more other commands 148 of various types. In some examples, the login-as user command 146, and/or the other command(s) 148 may be associated with the single user from among the user(s) 136. In those or other examples, the user command(s) 144 (e.g., the login-as user command 146, and/or the other command(s) 148) may be associated with the sandbox instance 112, as represented by the arrow depicted between the user command(s) 144 and the sandbox 108 in FIG. 1.

The environment 100 can include various types and/or numbers of user profiles. For example, the user profiles can include one or more user profile(s) 150. Individual ones of the user profile(s) 150 may be associated with corresponding users from among the user(s) 136.

Various portions of the environment 100 can be communicatively coupled to various types and/or numbers of third-party devices. For example, one or more third-party devices can manage, and/or be utilized to manage, various types and/or numbers of third-party applications. In some cases, the third-party device(s) can exchange one or more communications, via one or more third-party applications 152, with the various portions of the platform 102. However, the sandbox 108 and, in particular, the sandbox instance 112, can be isolated from the third-party application(s) 152, as represented by the cross out positioned on the dotted lines between the sandbox 108 and the third-party application(s) 152.

In various cases, the platform 102 can be utilized to provide sandbox cloning (e.g., data, software, and/or application cloning via the sandbox 108) in various ways. The cloning, which can include high-fidelity human resource information system (HRIS)-specific sandbox cloning, can be provided at scale. Unlike generic sandbox environments that provide relatively small, limited, and/or simple sandboxes, the platform 102 supports cloning entire HRIS configurations, including configurations pertaining to employees, roles, permissions, org charts, benefits, compensation plans, workflows, other types of HRIS constructs, or any combination thereof. The HRIS configurations can be cloned into isolated, testable sandbox environments. The sandbox 108 may refer to one or more of such testable sandbox environments and/or one or more sandboxes utilized therein. By cloning the entire HRIS configurations, referential integrity of the configurations can be maintained across complex HRIS data models while preserving uniqueness constraints (e.g., email addresses, SSNs, etc.).

The platform 102 can be utilized to perform configurable data obfuscation for human response (HR) compliance. Multiple cloning modes tailored for HRIS configurations can be provided and utilized for generating the sandbox 108. These modes can be uniquely tuned to support compliance with health insurance portability and accountability (HIPAA), general data protection regulation (GDPR), system and organization controls 2 (SOC 2), one or more other regulations, law, guidelines, etc., which may be utilized for various purposes, such as in HR contexts. For example, the sandbox 108 can be generated utilizing, updated to, changed to, transitioned between, etc., any of the modes. One or more of the modes can enable the application 104 to be utilized to perform various HRIS related operations in the corresponding mode(s).

A cloning mode (or "first cloning mode") can be utilized to generate a scrambled data sandbox. For example, the sandbox 108 may represent the scrambled data sandbox. The scrambled data sandbox can be generated by redacting and/or obfuscating personally identifiable information (PII) while preserving data shape. The PII being redacted and/or obfuscated can include salaries, birthdates, SSNs, one or more other types of PII of any type, or any combination thereof.

A cloning mode (or "second cloning mode") can be utilized to generate a partial data sandbox. For example, the sandbox 108 may represent the partial data sandbox. The partial data sandbox can be generated, for example, for testing (e.g., via the sandbox 108) with subsets of departments and/or geographies.

A cloning mode (or "third cloning mode") can be utilized to generate a metadata-only sandbox. For example, the sandbox 108 may represent the metadata-only sandbox. The metadata-only sandbox can be generated to allow for safe testing of configurations without exposing any employee data. In some instances, the sandbox 108 can be utilized for testing with the metadata-only sandbox cloning mode by generating the sandbox 108 without any employee data.

The platform 102 can be utilized with a login-as mechanism to enable role-based user simulation. For example, the login-as mechanism can enable an administrator (e.g., an HR administrator) from among the user(s) 136 to log in, within the sandbox 108, as an organization member, such as a manger, a recruiter, an employee, etc., or any combination thereof. The administrator can login as the organization member to simulate exact role-based views and approval chains. The sandbox 108 can be operated utilizing the login-as mechanism to support iterative testing of onboarding, benefits selection, compensation reviews, offboarding, and/or one or more other processes. The testing can be performed from real user perspectives, without needing actual users (e.g., without users actually logging in during run-time of the application 104).

The platform 102 can be utilized to provide isolation in various ways. In some examples, the isolation (e.g., data, software, and/or application isolation) can be provided by the platform 102, and/or by the computing device(s) utilized to manage the sandbox 108. In those or other examples, the isolation can be provided by the platform 102, and/or by the computing device(s) utilized to manage the sandbox instance 112. For instance, outgoing traffic associated with the sandbox instance 112 can be prohibited from being sent to the third-party application(s) 152.

The platform 102 can be utilized to provide support for live payroll and/or benefit workflow testing. The platform 102 can be utilized to safely simulate HRIS operations (e.g., high-risk HRIS operations) of relatively higher risk than other types of HRIS operations. For example, the platform 102 can be utilized to perform payroll calculations and/or general ledger (GL) exports, perform benefit eligibility and/or open enrollment (OE) configurations, perform separation workflows (e.g., (e.g., consolidated omnibus budget reconciliation act (COBRA) separation, severance, and/or access revocation) of various types, perform other relatively higher risk operations, or any combination thereof. These actions can be sandboxed from all downstream real-world effects (e.g., no live payouts, no email triggers, etc.) by the platform 102 and/or the sandbox 108.

The platform 102 can be utilized to provide customer-defined domain allowlisting via a gateway (e.g., an egress gateway). In some examples, for instance, with HR workflows being integrated with third-party systems (e.g., cloud-based identity and access management (IAM) services, automatic data processing (ADP) services, benefits providers, etc.), the sandbox 108 can perform operations based on an egress proxy allowing outbound requests only to domains explicitly allowed by a customer. Allowing outbound requests only to the explicitly allowed domains can be performed to avoid unintentional production triggers by the sandbox 108.

In some examples, various HRIS features can be utilized to manage the platform 102. For example, onboarding and/or offboarding simulation from all angles can be performed utilizing the platform 102. Managing any of various types of onboarding and/or offboarding simulation with the platform 102 allows HR teams to simulate onboarding/offboarding, such as with the sandbox 108, from an administrative perspective, an employee perspective, or a combination thereof. This simulation can also enable testing of device provisioning, doc collection, benefits enrollment, permission revocation, and/or application deprovisioning before doing any of those for people in the real-world.

Training sandboxes, such as the sandbox 108, can be utilized by decentralized teams (e.g., decentralized HR teams). For example, the sandbox 108 can be utilized by large organizations with role-specialized functions (e.g., role-specialized HR functions). In such an example or another example, the sandbox 108 can be utilized by payroll administrators, recruiters, benefits managers, other organization members, etc., or any combination thereof, which can each have scoped sandbox access.

These scoped sandboxes can allow safe experimentation with their area. For example, the sandbox 108 with scoped access can allow safe experimentation with various areas, such as payroll, paid time off (PTO), other earnings (OE), other areas, etc., or any combination thereof. The sandbox 108 can be utilized for custom training with real-looking data without production risks.

The sandbox 108 can be utilized for workflow automator testing (e.g., workflow automator testing in HR). Various types of workflows (e.g., HR workflows) may utilize triggers to perform actions. For example, a trigger to identify an employee marked as terminated, etc., may be set to send a severance packet. The sandbox 108 can enable testing of such flows in a fully isolated setting. For example, the testing can be utilized for channel-specific direct messages (DMs), recipient-specific DMs, emails, calendar integration, etc., or any combination thereof. Such testing can ensure accuracy before deploying the flows in production.

The sandbox 108 can be utilized for live role-permission simulation. For example, with granular role simulation in the sandbox 108, administrators (e.g., HRIS administrators can utilize the sandbox 108 to preview exactly what a newly hired manager would see in the real world should similar operations be performed in the real world. Utilizing the sandbox 108 for those simulations can ensure the correct permission scopes are utilized. Alternatively or additionally, utilizing the sandbox 108 for those simulations can reduce misconfigurations.

The sandbox 108 can be utilized as, and/or within, an auto-provisioned sandbox infrastructure (e.g., for an HRIS at enterprise scale). In contrast to traditional HRIS systems that offer one or two static environments, the platform 102 can provision isolated environments dynamically to support any number (e.g., hundreds) of concurrent sandbox instances (e.g., concurrent HRIS sandbox instances) per customer (e.g., one per business unit and/or geography of an organization). Each of the sandbox instances (e.g., concurrent HRIS sandbox instances) can be provisioned with separate lifecycles and/or refresh schedules. For instance, the sandbox instance 112 may represent one or more of such instances.

The platform 102 can be utilized to support creation of hundreds of customer sandbox instances for a customer while maintaining complete isolation from production. Alternatively or additionally, the platform 102 can be utilized to ensure isolation from other sandboxes. Alternatively or additionally, the platform 102 can be utilized to prevent third party externalities.

In alternative or additional examples, the platform 102 can be utilized to enable customer desired behavior using a multi-pronged configuration. This multi-pronged configuration can include various types of functionality, such as for the platform 102. For example, this multi-pronged configuration can include creation of a separate environment (e.g., a preview environment, such as the preview environment(s)/316 304, as discussed below with reference to FIGS. 3A/3B) with completely isolated resources from a production environment (e.g., the production environment(s) 302/314, as discussed below with reference to FIGS. 3A/3B). In such an example or another example, this multi-pronged configuration can enable utilization of a network firewall to block all external traffic and to use a domain allowlist for certain required domains. For instance, this multi-pronged configuration can enable creation of an egress gateway (e.g., a proxy) which allows customers to define domain allowlists. This multi-pronged configuration can include a data extraction tool for copying data for any company between environments.

In such an example or another example, this multi-pronged configuration can be highly customizable to support various customer operations/actions. These can include a partial-data customer sandbox, a scrambled data customer sandbox, a metadata-only customer sandbox, an isolated/connected customer sandbox, a log in as mechanism, (e.g., providing company administrators the ability to login as an employee in the customer sandbox to test out actions before performing them in the production environment, one or more other operations/actions, or any combination thereof. This functionality (e.g., of the platform 102, the sandbox 108, etc.) can greatly reduce feedback loops, and/or effort utilized to make relatively high profile, significant, and/or impactful changes.

According to a hypothetical example, a sandbox instance can include a copy of a company's data in a sandbox environment. Users can test changes against the sandbox instance without impacting their production implementation. Changes made in a preview instance can give users high confidence that the same changes made in production will result in the same effects as in the preview instance. In other words, the customers can test changes against customer data. HRISs can be utilized to test bulk actions on real customer data. Customer success systems can be utilized to test merging two customers into one. Reports and spend systems can be utilized to test products on real customer data that is unobfuscated. Separately, a user-facing application in a SaaS environment can be utilized to provide to administrators a UI to create and manage sandbox instances. The user-facing application can enable the administrators, via the UI, to log in to aa sandbox as themselves or another employee.

In the hypothetical example, extraction of data associated with a customer can be utilized to generate a sandbox. The data can be extracted by masking and/or obfuscating the data during extraction. The data can be masked and/or obfuscated and the masked and/or obfuscated (e.g., scrambled) data can be utilized to create the sandbox. For instance, the data being extracted, such as with the masking and obfuscating, can be utilized to create a scrambled data customer sandbox. The scrambled data customer sandbox can include the masked and/or obfuscated data to provide protection and/or security for the data (e.g., PII, confidential data, user-specific data, private data, etc., or any combination thereof). Obfuscation can include modifying PII customer data and/or secret API keys. Various types of content, such as the PII customer data and/or the secret API keys, can be modified so that the PII customer data and/or the secret API keys are unreadable and/or unusable to unauthorized individuals. Alternatively or additionally, the PII customer data and/or the secret API keys (e.g., being modified and/or unusable to unauthorized individuals) may remain usable for other purposes (e.g., legitimate purposes) like testing and/or analysis inside a sandbox environment (e.g., the sandbox 108).

For example, the PII customer data and/or the secret API keys being modified and/or unusable to unauthorized individuals can include employee details that are masked with dummy values. In some instances, the modifying and/or the protecting of the PII customer data and/or the secret API keys with respect to unauthorized individuals, and/or the masking of the employee details with dummy values, can be included/utilized in a scrambled data sandbox (e.g., the scrambled sandbox created via the content 1002, as discussed below in further detail with reference to FIG. 10).

According to a hypothetical example, enterprise workforce management platforms can be tested according to the techniques discussed herein so as to prevent problems in conventional testing environments that may not be able to fully replicate the complexity of production workflows and third-party integrations. A large-scale workforce management system for creating isolated sandbox instances can replicate aspects of a production environment. For example, a system at a large scale can include a system that manages an interconnected network of organizations (e.g., hundreds, thousands, millions, etc., or organizations) and activities (e.g., hundreds, thousands, millions, etc., of activities) that prepare individuals e.g., hundreds, thousands, etc., millions, or individuals) for employment, help them advance in their careers, and ensure a skilled workforce. The system may represent any number of computing devices (e.g., hundreds, thousands, millions, etc., of computing devices), computing systems (e.g., hundreds, thousands, millions, etc., of computing systems), etc., or any combination thereof.

In the hypothetical example, the system can establish a dedicated logical database for each instance, which may involve flattening data from multiple production sources to facilitate data isolation between sandboxes. Isolation can be further supported through the use of a network proxy to manage and restrict certain outbound communications and by rerouting system notifications to a designated channel. The system can also enable an administrator to simulate logging in as another user to test permission changes and user-specific experiences. This approach can allow organizations to test configurations and complex workflows, such as hiring or open enrollment, before implementation in a live environment, which may help to reduce operational risk.

In the hypothetical example, an enterprise sandbox platform can create high-fidelity, isolated copies of a production workforce management environment. The system may enable administrators and developers to test complex configurations, application integrations, and multi-step workflows before they are deployed to a live environment. This approach may help to reduce the risk of operational disruption and unintentional data disclosure. The platform can support the creation and management of multiple distinct sandbox instances per customer, which may allow different teams or projects to conduct testing in parallel with reduced interference.

In the hypothetical example, a multi-layered isolation of individual sandbox instances can be utilized. Each instance can be provisioned with its own dedicated logical database, which may be isolated from the databases of other sandboxes and the production environment. Data from various sources and collections within the production platform may be captured and flattened into this logical database, which can help to promote data integrity and prevent cross-contamination between test environments. This isolation may be further reinforced at the network level. The system can utilize a network proxy to block certain outbound network traffic from a sandbox instance by default. Communications may be permitted to a pre-approved list of domains, which can help to prevent unintended interactions with third-party production services, such as sending emails or making application program interface (API) calls.

In the hypothetical example, a platform can be enabled to simulate various operations. One operation may include processing a "login-as" command, which can allow an administrator of a computing device (e.g., a laptop computer, desktop computer, smartphone, or tablet) to securely proxy into the sandbox instance as another user within the organization. This can enable the administrator to view the system from that user's perspective, to verify permission changes and test user-specific experiences without manual intervention or affecting the actual user's account. This functionality can be beneficial for validating the impact of changes to complex configurations, such as role-based access controls or organizational restructuring. Furthermore, the isolated environment can support end-to-end testing of complex, multi-step workforce management (e.g., HR management) workflows, including hiring, onboarding, offboarding, and benefits open enrollment.

In the hypothetical example, a lifecycle of each sandbox instance may be managed by a state machine-based orchestrator. This orchestrator can handle the states of an instance, such as provisioning, resetting, restoring data, and marking it as ready for use, while also managing failure and retry logic. This can contribute to a consistent and reliable process for creating and refreshing sandboxes with up-to-date production data. To further enhance the testing experience, system-generated notifications that originate from workflows within the sandbox can be rerouted to a dedicated testing channel, allowing administrators to verify notification content and triggers without alerting actual employees. Database connection aliases can be dynamically registered on-demand to help manage resources as the number of instances grows. This enables the system to be scaled according to the number of instances.

In the hypothetical example, a unique system architecture can be utilized for generating sandbox computational environments. In particular, a multi-tenant sandbox platform may be architected to operate within a dedicated preview environment. This preview environment may be distinct from, but communicatively coupled with, a main production environment. The system can allow customers of a workforce management platform to provision and manage one or more isolated sandboxes. Each logical sandbox may correspond to one or more specific sandbox instances operating within the preview environment. The production environment may host a primary customer-facing customer sandbox application, which can provide the user interface for an administrator to create instances, manage permissions, and initiate actions, such as a "login-as" command. This application may communicate with the preview environment via a secure, dedicated API. The preview environment can host the sandbox instances, their corresponding logical databases, and the orchestration logic to manage their lifecycle and isolation. This type of bifurcated architecture may separate the management interface from the execution environment, which can allow for secure control over testing capabilities without exposing the preview infrastructure directly.

In the hypothetical example, communication between the production and preview environments may be controlled. When an action is initiated in the production-side application, it may make a secure API call to a specific preview endpoint in the preview environment. These endpoints can be protected by an authentication mechanism, such as a custom decorator, which can validate that the request is from a trusted production service and is signed with a shared private key, associated with a token. This approach can help prevent unauthorized access to the preview infrastructure. Furthermore, routing within the preview environment may be handled via subdomains. Requests intended for infrastructure-level operations, such as querying the list of available instances, may be directed to a generic application hostname (e.g., app.previewdomain.com). In contrast, requests intended to operate on the data within a specific sandbox instance may be routed to a unique subdomain corresponding to that instance's identifier (ID) (e.g., <previewinstanceID>.previewdomain.com). This mechanism can help direct application logic to either the central infrastructure database or the specific logical database of the target sandbox instance.

In the hypothetical example, data isolation can be performed with a logical database architecture. In particular, the system may include a multi-layered approach to data isolation, which may be achieved through a logical database architecture. Unlike a production environment, which might store data across numerous physically distinct databases and clusters based on function or product, a preview environment can consolidate data for a single sandbox instance into one dedicated logical database. This may be accomplished through a data refresh process, which can take a snapshot of a customer's data from relevant production sources. This captured data may then be flattened and loaded into a new, isolated logical database within one of several preview clusters. By flattening the data, the system can help to contain all objects, including folders and files, along with their associated metadata and permissions, within a single database boundary for that instance. This can help to prevent data from one sandbox instance from being visible or accessible from another.

In the hypothetical example, a large number of sandbox instances can be supported by horizontally scaling platform services. To avoid potential limitations in existing systems, such as a namespace cardinality limit in a document-oriented database, the system may employ multiple preview clusters. A central base cluster can be used to store infrastructure-level configuration data, such as a master record of existing preview instances and which preview cluster they are assigned to. This base cluster may not contain sensitive customer data. When a new sandbox instance is provisioned, an orchestration service can query the base cluster to find a preview cluster with available capacity and assign the new logical database to it. This can allow for the automated provisioning of new physical clusters as demand grows, without manual configuration changes or application deployments. The separation of configuration data into a base cluster and customer data into scalable preview clusters can provide for a scalable data architecture.

In the hypothetical example, dynamic database connection management can be performed to efficiently manage database connections in an environment with a potentially large and fluctuating number of logical databases, the system can employ a dynamic, on-demand alias registration technique. A workforce management platform may define many distinct database connection aliases to connect to various data collections. All of these aliases could be registered for all possible databases at application startup. However, since pre-emptive registration may be less scalable and could lead to increased memory consumption and slower startup times in various cases, the disclosed system can, alternatively, register connection aliases for a specific sandbox instance only when a request targeting that instance is received.

In the hypothetical example, when a web request arrives at a preview instance-specific subdomain (e.g., abc123.previewdomain.com), application middleware can first verify the validity of the instance identifier (abc123). If valid, it may then dynamically register the full set of required connection aliases specifically for that instance's logical database (e.g., databasename_abc123). This registration process can be a relatively lightweight operation (e.g., an operation using a number of resources that is less than a threshold) that updates in-memory data structures. Following registration, a helper function can be invoked to instruct data models associated with the application to append the unique instance identifier suffix to their standard alias names for the duration of the request. This approach can help route any subsequent database query to the appropriate logical database. The actual database connections may be established lazily when a query is first executed. This on-demand, just-in-time approach to connection management can allow the system to support a large number of sandbox instances while helping to maintain efficient startup times and relatively lower resource utilization.

In the hypothetical example, network isolation and external interaction control can be enabled. In particular, to help prevent actions within a sandbox instance from having unintended real-world consequences, the system can implement a network isolation policy. Some or all outbound network traffic originating from the preview environment may be blocked by default at the infrastructure level. This can be enforced by a network proxy that inspects and filters egress traffic. This default-deny posture can be a beneficial safety measure that helps to prevent unintended interactions with external third-party systems, such as sending production emails, triggering payments through a financial service, or writing data to a live third-party application.

In the hypothetical example, while all traffic may be blocked, certain integrations may benefit from network access to function, even in a test environment. To accommodate these use cases, the system can use a domain allowlist. Administrators and developers of the platform can explicitly register the domains of any third-party services that could be accessible from the sandbox. The network proxy can be configured with this allowlist and may then permit outbound traffic only to these pre-approved destinations. This can shift the responsibility for managing external interactions to individual product teams, creating a transparent and auditable process for enabling external connectivity. This combination of a default-deny policy with an explicit allowlist can provide a mechanism for enabling testing of third-party integrations while maintaining a high degree of safety and helping to prevent unintentional side effects.

In the hypothetical example, sandbox instance lifecycle management can include managing the lifecycle of each sandbox instance by a state machine-based sandbox orchestrator. This orchestrator can help to create, refresh, and manage instances in a consistent and reliable manner. The process can begin when a request to create a new instance is received, placing the instance into a Provisioning state. During this state, infrastructure, including the logical database, may be allocated. If successful, the instance can transition to the ProvisionedEmpty state, indicating it is ready to be populated with data. If provisioning fails, it may enter a ProvisioningFailed state, from which the process can be retried.

In the hypothetical example, once provisioning a sandbox instance is in the ProvisionedEmpty state, or if an existing instance in the Ready state is to be refreshed, a reset and restore command can initiate the data population flow. The instance may first enter the Resetting state, where existing data, configurations, and dependencies in its logical database are cleared. Upon successful completion of the reset, the instance can move to the Restoring state, during which a fresh snapshot of production data may be copied and loaded into the now-empty logical database. If the restore operation is completed successfully, the instance may then transition to the Ready state, making it available for user access. The flow can be idempotent; if a step such as resetting or restoring fails, the instance can enter a corresponding failed state (ResetFailed, RestoreFailed), and the operation may be safely retried to reduce the likelihood of inconsistent states. This state machine can provide visibility into the status of each instance and can contribute to a predictable and resilient process for sandbox management.

In the hypothetical example, user simulation and notification rerouting can be performed. In particular, a feature that may be beneficial for testing is a "login-as" capability, which can allow an administrator to experience the sandbox environment from the perspective of another employee. An authorized customer or administrator can issue a login-as user command. The system can receive this command along with a target user's identifier. Within the context of the selected sandbox instance, the system can generate a temporary session that associates the administrator's session with the target user's profile and their corresponding permissions. This can allow the administrator to navigate the platform and execute commands as that user might, to verify the effects of permission changes, test new feature visibility for specific roles, or debug user-reported issues in a safe, isolated context. This can reduce the need for manual communication with employees or sharing of credentials to validate system behavior.

In the hypothetical example, confusion with testing experiences can be prevented. Notifications generated by workflows within a sandbox instance can be automatically intercepted and rerouted. Workflows such as employee onboarding or benefits open enrollment may trigger notifications, such as emails or messages to services like a messaging service. Instead of sending these notifications to actual employee email addresses or production channels, the system can capture them and redirect them to a dedicated testing channel. This channel can be accessible to administrators of the sandbox. This allows them to verify that the correct notifications are being triggered by the correct actions, inspect the content of the notifications for accuracy, and confirm workflow logic without sending messages to the actual users whose data is being used in the test. This automatic rerouting may be configured at the sandbox level and is a component for testing communication-heavy workflows in a non-disruptive manner.

In the hypothetical example, user permission changes with Login-As functionality can be validated. An administrator may need to delegate new responsibilities to a payroll manager, which may involve granting access to a folder containing financial reports. To validate these permission changes before deployment in a live environment, the administrator can utilize a sandbox instance. The administrator can navigate to the sandbox instance and modify permissioned access policies associated with the payroll manager's role, granting read/write access to a specific folder. To confirm the change operates as intended, the administrator can use a login-as user command from a sandbox application interface. The system can receive this command, which may include an identifier for the target sandbox instance and the payroll manager's user profile. The system may then provide the administrator with a temporary, proxied session within the sandbox that is configured to replicate the payroll manager's view and permissions. The administrator can then navigate to the folder in question and confirm access to the files within it, while also verifying that other restricted areas remain inaccessible. This can facilitate the validation of permission changes in a realistic context.

In the hypothetical example, multiple isolated instances can be provisioned and managed for parallel testing. As an example, an enterprise may conduct separate testing initiatives concurrently. For instance, an information technology department could test a new time-tracking application integration, while a human resources (HR) department could configure changes for an annual benefits open enrollment. Using a customer-facing sandbox application in the production environment, the enterprise can provision two distinct sandbox instances, XX01 and XX02, within their preview environment. The system architecture can assign each instance its own isolated logical database. These logical databases can be stored on one of several available preview clusters, with the mapping and capacity managed by a central base cluster. An administrator can access the first instance by navigating to its unique subdomain, such as xx01.preview.example.com. Upon receiving this request, the system's back-end can dynamically register the database connection aliases to point to the logical database for instance XX01. The administrator can then test the time-tracking application, and any data modifications may be contained within that instance. Simultaneously, another administrator can access the second instance via xx02.preview.example.com and begin configuring settings. Due to the logical database isolation, the configuration changes made by one team may be isolated from the other team. This configuration may permit both teams to work in parallel, which may reduce interference or the risk of data cross-contamination.

In the hypothetical example, the fidelity, security, and efficiency of testing complex workforce management platforms can be improved. One potential technical effect is a reduction in operational risk by facilitating high-fidelity testing. The architecture can create isolated sandbox instances by flattening data from multiple production sources into a dedicated logical database for each instance. This can enable configurations, user data, and permission structures to be replicated. The inclusion of a login-as capability can enable administrators to validate how permission or configuration changes may appear to specific users, which can reduce the reliance on certain manual verification processes. Organizations can test complex workflows with an improved correspondence between behavior observed in the sandbox and behavior in a production environment.

In the hypothetical example, security and data integrity can be improved through a multi-layered isolation strategy. The logical database architecture can help prevent data from one sandbox instance from interfering with another or with the production environment. This isolation can be further supported at the network level by a proxy that can block outbound traffic by default. This default-deny posture, combined with a domain allowlist for certain third-party test endpoints, can help mitigate unintended external actions. Examples of such actions could include sending test emails to employees, initiating financial transactions, or writing test data to a third-party's production services. This approach can help reduce certain types of errors and support data protection efforts.

In the hypothetical example, administrative and testing efficiency may be improved. For instance, a state machine-based orchestrator can automate and standardize aspects of the sandbox lifecycle, such as provisioning and refreshing instances with production data. This automation can reduce some of the time and potential for error associated with manual setup processes. In some implementations, the automatic rerouting of system-generated notifications (e.g., emails or messages to a messaging service) to a designated testing channel can facilitate the validation of communication-heavy workflows. This may allow administrators to verify notification content and triggers while helping to reduce test-related communications sent to employees.

In the hypothetical example, scalability and resource efficiency can be achieved. For example, the use of dynamic, on-demand registration of database connection aliases may help to reduce performance degradation and memory usage. For example, on-demand registration can be performed instead of registering connections for many sandboxes at application startup. This on-demand approach may help the system support a larger number of instances while managing responsiveness. This can be complemented by a multi-cluster database that supports horizontal scaling, which may allow the platform to accommodate a growing number of instances by mitigating certain technical limits associated with a single database cluster.

In the hypothetical example, the creation of isolated and scalable sandbox environments can be enabled. A sandbox instance can be provisioned with a dedicated logical database, which may be logically isolated from a production environment and other sandbox instances. A data refresh process can capture a snapshot of a customer's data from one or more production sources and flatten it into this logical database. This type of architecture may help actions performed in one sandbox to not affect others, which can reduce the likelihood of data cross-contamination and support data integrity. This isolation can be further supported through network egress control. For example, the system may use a network proxy to block outbound traffic by default, while a domain allowlist can be used to selectively permit traffic to certain pre-approved endpoints. Additionally, system-generated notifications, such as emails or messages to a messaging service, can be intercepted and rerouted to a dedicated testing channel. A feature may also allow an authorized administrator, for instance, a user of a computing device (e.g., a laptop computer, desktop computer, smartphone, or tablet), to issue a login-as command to view and interact with the sandbox from another user's perspective. This can be utilized to verify permission changes or role-specific feature visibility.

In the hypothetical example, the management and scalability of the sandbox instances can be supported by additional features. The lifecycle of a sandbox instance may be managed by a state machine-based orchestrator. This orchestrator can guide the instance through a series of defined states, such as Provisioning, Resetting, Restoring, and Ready. The process may include failure-handling and retry logic, which can contribute to a consistent mechanism for managing sandbox instances. To support multiple instances, the platform can be designed with a scalable architecture. It may employ a dynamic, on-demand registration of database connection aliases. Rather than registering connections for many possible instances at application startup, the system can register the necessary connections for a specific instance when a request targeting it is received. This approach, potentially combined with a multi-cluster database architecture, may allow the platform to operate efficiently and help maintain performance as the number of instances grows.

In the hypothetical example, a platform for creating isolated sandbox instances can replicate aspects of a production workforce management environment. The system may combine a logical database architecture for data isolation, network egress controls for managing external communications, and features such as a user simulation capability. This combination of features may allow organizations to validate complex configurations and workflows before deployment. This approach may help to reduce certain operational risks associated with implementing changes in a production enterprise system.

Figure 2:
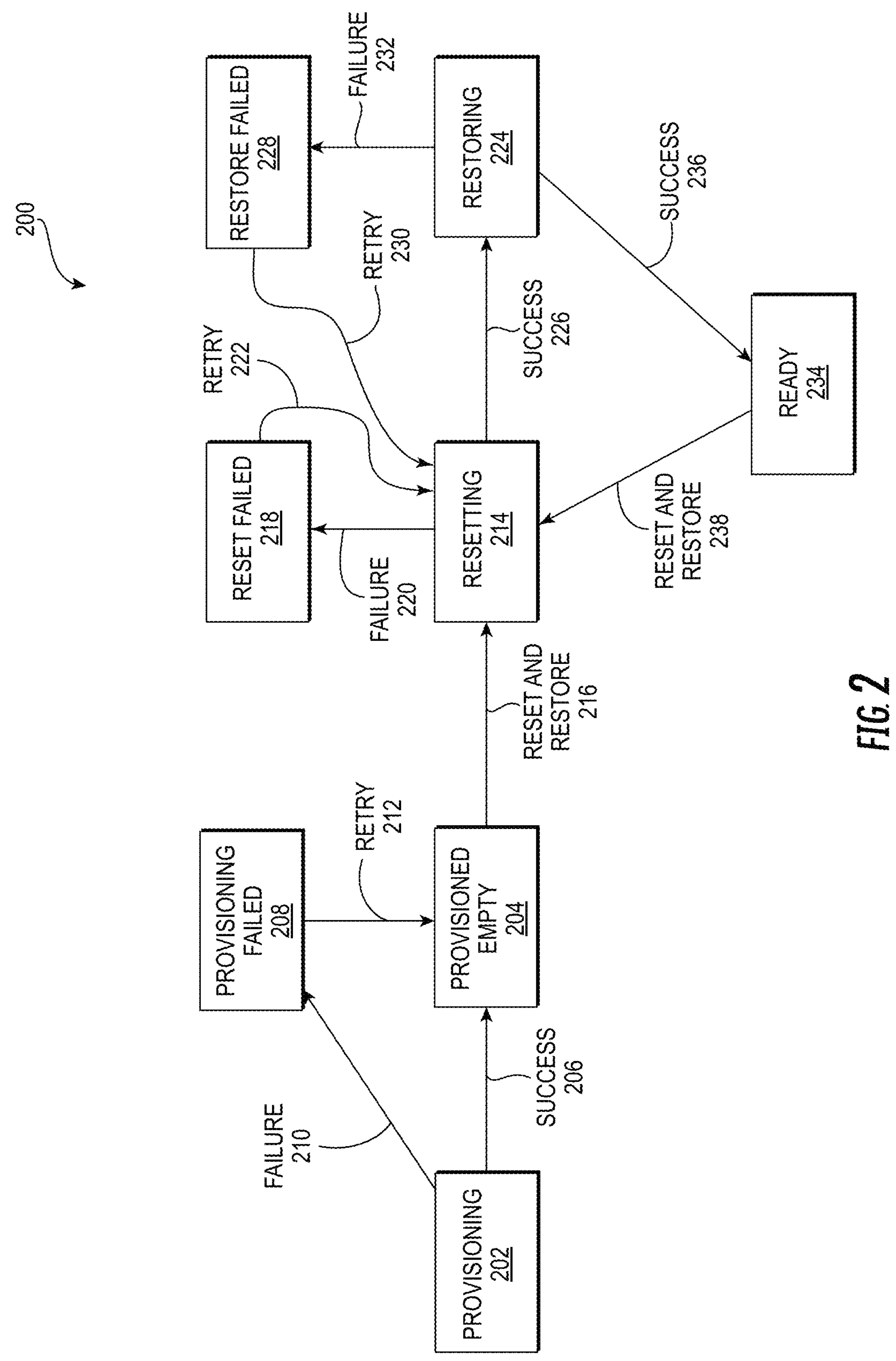
FIG. 2 depicts a block diagram of a state machine utilized by computing systems that develop and execute sandboxes for large-scale workforce management platforms, according to example embodiments of the present disclosure.

FIG. 2 depicts a block diagram of a state machine 200 utilized by computing systems that develop and execute sandboxes for large-scale workforce management platforms, according to example embodiments of the present disclosure. The state machine 200 can include one or more states utilized to manage any of one or more sandbox instances (e.g., the sandbox instance 112). For example, the state machine 200 can include a plurality of states. The states can include a provisioning state (also referred to herein simply as "provisioning") 202. The provisioning state 202 can represent the sandbox instance 112 being scheduled to, and/or being at a time utilized to, begin creating and/or initializing the sandbox instance 112. Alternatively or additionally, the provisioning state 202 can represent the sandbox instance 112 commencing one or more operations to the process of the sandbox instance 112 being created and/or initialized. Alternatively or additionally, the provisioning state 202 can represent the sandbox instance 112 being in the process of beginning to create and/or initialize the sandbox instance 112.

The states of the state machine 200 can include a provisioned empty state (also referred to herein simply as "provisioned empty") 204. The provisioned empty state 204 can represent one or more operations of the computing environment 100 associated with the system infrastructure having been created. For instance, the provisioned empty state 204 can represent the system infrastructure not yet including user-specific data and/or user-specific configurations. In some cases, the system infrastructure can be utilized for operation of the sandbox instance 112.

The provisioned state 202 can be utilized for provisioning sandbox instances that did not previously exist. The provisioned state 202 can be utilized to provision the sandbox instances by starting the provisioning with the provisioning state 202. In some examples, the provisioned state 202 can be utilized for the sandbox instance 112 being, for instance, a new sandbox instance.

The state machine 200 can transition from the provisioning state 202 to the provisioned empty state 204 based on a success event 206. The success event (also referred to herein simply as "success") 206 can include a triggering event, such as based on a result of the provisioning state 202. The triggering event may occur when a flag is set at completion of the provisioning state 202 to identify successful provisioning of the sandbox instance 112, and/or completion of the provisioning thereof. For instance, the provisioning state 202 may succeed due to sufficient capacity being available and/or being generated in the computing device(s) utilized to manage the sandbox instance 112. The provisioned empty state 204 can trigger a transition to a resetting state (e.g., the resetting state 214, as discussed below in further detail) based on the success event 206.

The states of the state machine 200 can include a provisioning failed state (also referred to herein simply as "provisioning failed") 208. One or more operations of the provisioning failed state 208 can be performed based on the provisioning state 202 not having been completed. For example, the provisioning failed state 208 can identify a failure, an error, etc., such as via one or more codes and/or identifiers (IDs), associated with the provisioning state 202 and/or the operation(s) thereof.

The state machine 200 can transition from the provisioning state 202 to the provisioned failed state 208 based on a failure event 210. The failure event (also referred to herein simply as "failure") 210 can include a triggering event, such as based on omission of a result, and/or failure of completion, of the provisioning state 202. The triggering event may occur when a flag is unset and/or cleared due to the provisioning state 202 not having been completed. The failure event 210 can be utilized to identify unsuccessful provisioning of the sandbox instance 112, and/or lack of completion of the provisioning thereof. For instance, the provisioning state 202 may fail due to lack of capacity in the computing device(s) utilized to manage the sandbox instance 112.

The state machine 200 can transition from the provisioning failed state 208 to the provisioned empty state 204 based on a retry event 212. The retry event (also referred to herein simply as "retry") 212 can include a triggering event, such as based the provisioning failed state 208, and/or one or more results (e.g., one or more identifiers) generated thereby.

The retry event 212 can be utilized to transition to the provisioning state 202 to retry provisioning of the sandbox instance 112. The provisioning failed state 208 can transition to the provisioning state 202 via the provisioned empty state 204, which can trigger a transition to the provisioning state 202 based on the failure event 210. Alternatively, the provisioning failed state 208 can possibly transition directly to the provisioning state 202. The provisioning state 202 can be performed based on any number of failure events. The provisioning state 202 can iteratively cause the provisioning state 202 to be performed based on one or more failure events. The provisioning state 202 can be performed to retry the provisioning of the sandbox instance 112 as many times as needed, until the provisioning state 202 is successful and the provisioning state 202 transitions to the provisioned empty state 204.

The states of the state machine 200 can include a resetting state (also referred to herein simply as "resetting") 214. One or more operations of the resetting state 214 can be performed based on the provisioning state 202 having been completed, and/or based on the provisioned empty state 204 having been completed. Alternatively or additionally, the resetting state 214 can identify a success, a completion, etc., such as via one or more codes, of the provisioning state 202, the operation(s) thereof, the provisioned empty state 204, and/or the operation(s) thereof.

The state machine 200 can transition from the provisioned empty state 204 to the resetting state 214 based on a reset and restore event 216. The reset and restore event (also referred to herein simply as "reset and restore") 216 can include a triggering event. The triggering event may occur when a flag is set due to the provisioning state 202 and/or the provisioned empty state 204 having been completed. In some examples, for instance with the sandbox instance 112 being a previous sandbox instance (e.g., a previously existing sandbox instance), the reset state 214 can be utilized to reset the sandbox instance 112. The sandbox instance 112 can be reset by cleaning up dependencies associated with the sandbox instance 112. Data (e.g., any unnecessary data, and possibly some of the remaining data, as well; or, in some cases, all data) can be dropped from the sandbox instance 112. The resetting state 214 can be utilized to enable the sandbox instance 112 such as, for instance, when the sandbox instance is a previous sandbox instance, to be restored (e.g., via the restoring state 224, as discussed below in further detail) and/or reused (e.g., via the ready state 234, as discussed below in further detail)

The states of the state machine 200 can include a reset failed state (also referred to herein simply as "reset failed") 218. One or more operations of the reset failed state 218 can be performed based on the resetting state 214 not having been completed. For example, the reset failed state 218 can identify a failure, an error, etc., such as via one or more codes and/or identifiers, associated with the resetting state 214 and/or the operation(s) thereof.

The state machine 200 can transition from the resetting state 214 to the reset failed state 218 based on a failure event 220. The failure event (also referred to herein simply as "failure") 220 can include a triggering event, such as based on omission of a result, and/or failure of completion, of the resetting state 214. The triggering event may occur when a flag is unset and/or cleared due to the resetting state 214 not having been completed. The failure event 220 can be utilized to identify unsuccessful resetting of the sandbox instance 112, and/or lack of completion of the resetting thereof. For instance, the resetting state 214 may fail due to partial or entire failure of resetting of the sandbox instance 112.

The state machine 200 can transition from the reset failed state 218 to the resetting state 214 based on a retry event 222. The retry event (also referred to herein simply as "retry") 222 can be utilized to retry the resetting of the sandbox instance 112 in a similar way as for retrying the provisioning of the sandbox instance 112. For example, the resetting of the sandbox instance 112 can be retried via the resetting state 214 in a similar way as for the provisioning 202 being retried via the provisioning state 202.

The states of the state machine 200 can include a restoring state (also referred to herein simply as "restoring") 224. One or more operations of the restoring state 224 can be performed based on the resetting state 214 having been completed. Alternatively, the operation(s) of the restoring state 224 can be performed based on the provisioning state 202, the provisioned empty state 204, and/or the resetting state 214 having been completed. Alternatively, the operation(s) of the restoring state 224 can be performed based on all of the provisioning state 202, the provisioned empty state 204, and/or the resetting state 214 having been completed. In some examples, the restoring state 224 can be performed based on identification of a success, a completion, etc., such as via one or more codes, of the resetting state 214, and/or the operation(s) thereof. Alternatively, the restoring state 224 can be performed based on identification of a success, a completion, etc., such as via one or more codes, of all of the provisioning state 202, the provisioned empty state 204, the resetting state 214, and/or the operation(s) thereof.

The state machine 200 can transition to the restoring state 224 based on a success event 226 associated with the resetting state 214. The success event (also referred to herein simply as "success") 226 can include a triggering event. The triggering event may occur when a flag is set due to the resetting state 214 having been completed. Alternatively, the triggering event may occur when a flag is set due to the resetting state 214 and the provisioned empty state 204 having been completed. In alternative examples, the state machine 200 can transition to the restoring state 224 based on one or more events (e.g., the reset and restore event 216, and one or more of the success events 206/226 associated with the provisioned empty state 204 and/or the resetting state 214). In alternative examples, the state machine 200 can transition to the restoring state 224, from the provisioned empty state 204 and/or the resetting state 214.

In some examples, the restoring state 224 can be utilized to restore the sandbox instance 112. The sandbox instance 112 being restored can include a new sandbox instance (e.g., a sandbox instance that was freshly provisioned and/or not used, such as in the ready state 234) or a previous sandbox instance (e.g., a previously existing sandbox instance, having gone through any of various states of the state machine 200, such as the ready state 234, and subsequently having gone through the resetting state 214).

The sandbox instance 112 can be restored by starting to copy data, and/or by copying data (e.g., a partial or an entire amount of data) that is procured from production, to the sandbox instance 112. Alternatively or additionally, the sandbox instance 112 can be restored by starting to copy one or more of the latest dependencies (e.g., one or more recent dependencies used previously within a threshold time period), and/or by successful copying the latest dependency(ies) (e.g., a partial or an entire amount of the latest dependency(ies)) to the sandbox instance 112. Alternatively or additionally, the sandbox instance 112 can be restored by starting to copy one or more portions of information utilized to enable operation of the sandbox instance 112, and/or by successfully copying the information (e.g., a partial or an entire amount of the information) to the sandbox instance 112.

The states of the state machine 200 can include a restore failed state (also referred to herein simply as "restore failed") 228. One or more operations of the restore failed state 228 can be performed based on the restoring state 224 not having been completed. For example, the restore failed state 228 can identify a failure, an error, etc., such as via one or more codes and/or identifiers, associated with the restoring state 224 and/or the operation(s) thereof.

The state machine 200 can transition from the restoring state 224 to the restore failed state 228 based on a failure event 232. The failure event (also referred to herein simply as "failure") 232 can include a triggering event, such as based on omission of a result, and/or failure of completion, of the restoring state 224. The triggering event may occur when a flag is unset and/or cleared due to the restoring state 224 not having been completed. The failure event 232 can be utilized to identify unsuccessful restoring of the sandbox instance 112, and/or lack of completion of the resetting thereof. For instance, the restoring state 224 may fail due to partial or entire failure of restoring of the sandbox instance 112.

The state machine 200 can transition from the restore failed state 228 to the resetting state 214 and/or the restoring state 224 based on a retry event 230. The retry event (also referred to herein simply as "retry") 230 can be utilized to retry the resetting and/or the restoring of the sandbox instance 112 in a similar way as for retrying the provisioning of the sandbox instance 112. For example, the restoring of the sandbox instance 112 can be retried via the restoring state 224 in a similar way as for the provisioning 202 being retried via the provisioning state 202.

The states of the state machine 200 can include a ready state (also referred to herein simply as "ready") 234. One or more operations of the ready state 234 can be performed based on the restoring state 224 having been completed. Alternatively, the operation(s) of the ready state 234 can be performed based on the provisioning state 202, the provisioned empty state 204, the resetting state 214, and/or the restoring state 224 having been completed. Alternatively, the operation(s) of the restoring state 224 can be performed based on all of the provisioning state 202, the provisioned empty state 204, the resetting state 214, and the restoring state 224 having been completed. In some examples, the ready state 234 can be performed based on identification of a success, a completion, etc., such as via one or more codes, of the restoring state 224, and/or the operation(s) thereof. Alternatively, the ready state 234 can be performed based on identification of a success, a completion, etc., such as via one or more codes, of all of the provisioning state 202, the provisioned empty state 204, the resetting state 214, the restoring state 224, and/or the operation(s) thereof.

The state machine 200 can transition to the ready state 234 based on a success event 236 associated with the restoring state 224. The success event (also referred to herein simply as "success") 236 can include a triggering event. The triggering event may occur when a flag is set due to the restoring state 224 having been completed. Alternatively, the triggering event may occur when a flag is set due to the provisioned empty state 204, the resetting state 214, and the restoring state 224 having been completed.

In alternative examples, the state machine 200 can transition to the ready state 234 based on one or more success events (e.g., the success event 236, and one or more of the success events 206/226 associated with the provisioned empty state 204 and/or the resetting state 214). In alternative examples, the state machine 200 can transition to the ready state 234, from the provisioned empty state 204, the resetting state 214, and/or the restoring state 224.

The ready state 234 can be utilized for operation of the sandbox instance 112. The operation of the sandbox instance 112 via the ready state 234 can include one or more users (e.g., any of the user(s) 136, or a combination thereof) logging into the sandbox 122. For instance, the operation of the sandbox instance 112 via the ready state 234 can include any of the user(s) 136 logging into the sandbox 122 with login-as content (e.g., a login-as name). The user 136 can access data (e.g., the latest data in the sandbox instance 112). In some examples, the user 136 accessing the sandbox instance 112 may be based on a login of the user 136 prior to the restoring performed via the restoring state 224. In alternative examples, the user 136 accessing the sandbox instance 112 may be based on a login of the user 136 after the restoring performed via the restoring state 224. The user 136 can access the latest and most up-to-date data based on the restoring performed via the restoring state 224.

The state machine 200 can move from any state to a previous state based on one or more failures. For example, the state machine 200 can move from any current state to operate via one or more previous states based on the current state failing. In such an example, moving to the previous state(s) can be performed to then retry the current state. Eventually, the state machine 200 can proceed through any of the states, or a combination thereof, to the ready state 234.

The state machine 200 can be utilized by the user 136 to access the sandbox instance 112, and/or to perform one or more operations using the sandbox instance 112, until a refresh occurs. In some examples, the refresh can occur based on the computing device(s) (e.g., the computing device(s) utilized to manage the sandbox instance 112) determining to perform the refresh prior to continuing operation of the ready state 234. The refresh (e.g., an automated refresh) can be performed automatically notwithstanding whether one or more selections authorizing the refresh are received via user input from the user 136. Alternatively, the computing device(s) can output a refresh notification to the user 136 and wait to receive one or more selections authorizing the refresh via user input from the user 136, prior to performing the refresh (e.g., a manual refresh).

The state machine 200 can transition from the ready state 234 to the resetting state 214 based on a reset and restore event 238. The reset and restore event (also referred to herein simply as "reset and restore") 238 can be utilized to retry the resetting of the sandbox instance 112 based on the reset and restore event 238 in a similar way as for retrying the resetting of the sandbox instance 112 based on the retry event(s) 222/230. For example, the resetting of the sandbox instance 112 can be retried via the resetting state 214.

According to a hypothetical example, a refresh can be utilized, such as in a workforce management system, to ensure that data in a sandbox instance is as up-to-date as possible. The refresh can include refreshing and restoring data at any time. The refresh can be utilized to enable changes to be made dynamically, and in near real-time. Because any changes made to employee, and/or their data, may affect several downstream systems, the changes can be provided to customer devices (e.g., one or more devices of the user(s) 136) using the sandbox instance to test those changes. The customer devices can be utilized test the changes without affecting live systems and/or data In the hypothetical example, if an administrator changes a work location of an employee, that might trigger a number of different updates. Various employee information might be affected, such as information associated with insurance, payment/payroll processes, the organization with the employee, the management structure, the employee's supervisor, etc. The sandbox instance can be utilized to test all the changes, such as downstream changes. The sandbox instance can be built to ensure that there is a way to test any changes for the employee before the changes become live.

In the hypothetical example, data isolation can be achieved using the sandbox and the instances therein. The data isolation can be utilized to test changes affecting third-party software. The changes can be blocked from impacting the third-party software to make sure data is copied properly beforehand. The sandbox used by one employee can be configured to make sure that changes made with the sandbox that affect third-party software do not affect/impact other sandboxes used by other employees.

In the hypothetical example, one or more aliases from among a plurality of aliases associated can be registered with the workforce management platform, the alias(es) not being previously registered at startup along with remaining aliases of the plurality of aliases. The alias(es) can be dynamically registered for the sandbox instance on-demand based on a request for the sandbox instance being received. One or more notifications can be automatically rerouted from among notifications generated by workflows within the sandbox. The notification(s) can include at least one of emails or messaging service messages, the notification(s) being automatically rerouted to a testing channel accessible by an administrator of the workforce management platform.

In the hypothetical example, outbound network traffic associated with the sandbox instance can be blocked by default, by using a network proxy. The network proxy can selectively permit traffic using the sandbox instance according to a pre-approved list of domains. Communications to third-party systems can be blocked by auditing traffic using a network proxy and one or more domain allowlists, the network proxy being coupled between the computing system and the third-party systems. A request can be received from a customer device, the request being associated with testing a third-party application and the workforce management platform using the sandbox instance. Based on the request, an action using the third-party application and the workforce management platform can be performed with the sandbox instance. Data in the logical database can be modified by the performance of the action, the data being isolated from other data in other logical databases associated with other sandboxes in the workforce management platform.

In the hypothetical example, a first request can be received, from a customer device and via customer input to the customer device, the first request including a first identifier utilized to select the sandbox instance as a first sandbox instance with a first cluster. A second request can be received, from the customer device and via customer input to the customer device, the second request including a second identifier utilized to select a second sandbox instance associated with a second cluster physically isolated from the first cluster. The first sandbox instance and the second sandbox instance may be logically isolated from one another. The first sandbox instance and the second sandbox instance may be both associated with a base preview cluster. The base preview cluster can include collection and configuration data but not customer data, the collection and configuration data being associated with a plurality of clusters.

In the hypothetical example, a request can be received from an administrator device, the request being to set a permission associated with a folder of the user. The sandbox instance can be updated by setting the permission associated with the folder and sharing the permission to each of a plurality of files in the folder. The command can include a request to access a file in the folder, and a permission associated with the file is set in response to the sharing of the permission associated with the folder. An action that includes granting the request based on a permission assigned to the user satisfying the permission associated with the file can be performed.

In the hypothetical example, objects and permissioned access with a sandbox orchestrator can be dynamically managed using a plurality of sandbox modes in a preview environment. The objects in the sandbox instance with the sandbox orchestrator can be dynamically managed in a test mode. The permissioned access to the objects with the sandbox orchestrator can be dynamically managed in the test mode.

Figure 3A:
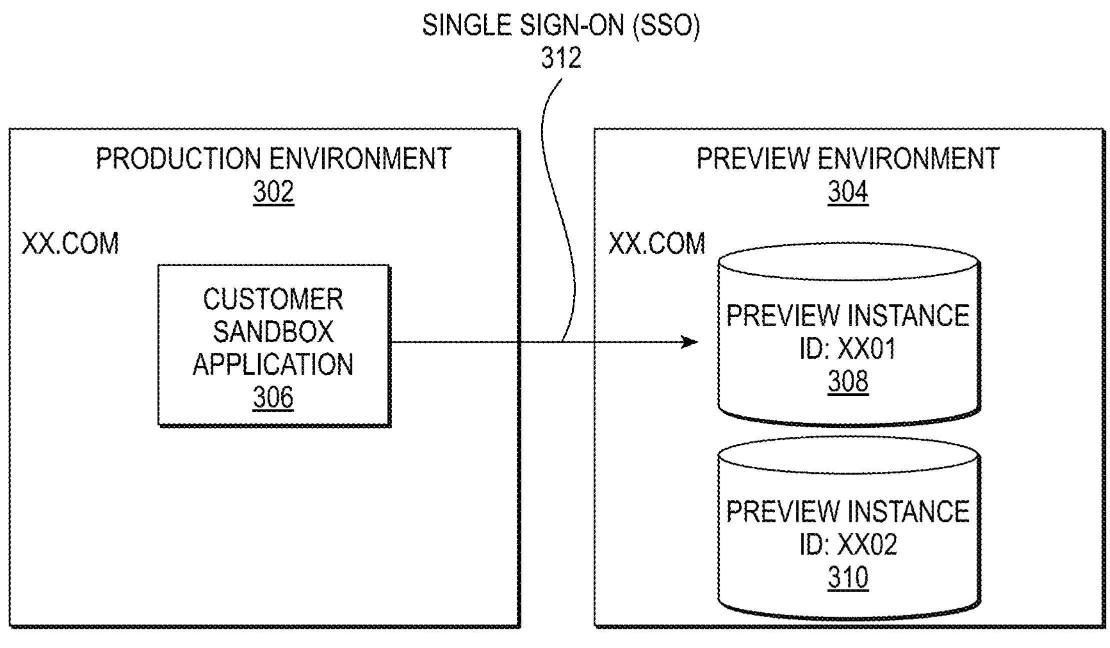
FIGS. 3A and 3B depict block diagrams of production and preview environments for generating and verifying sandboxes with computing systems that develop and execute the sandboxes for large-scale workforce management platforms, according to example embodiments of the present disclosure.
Figure 3B:
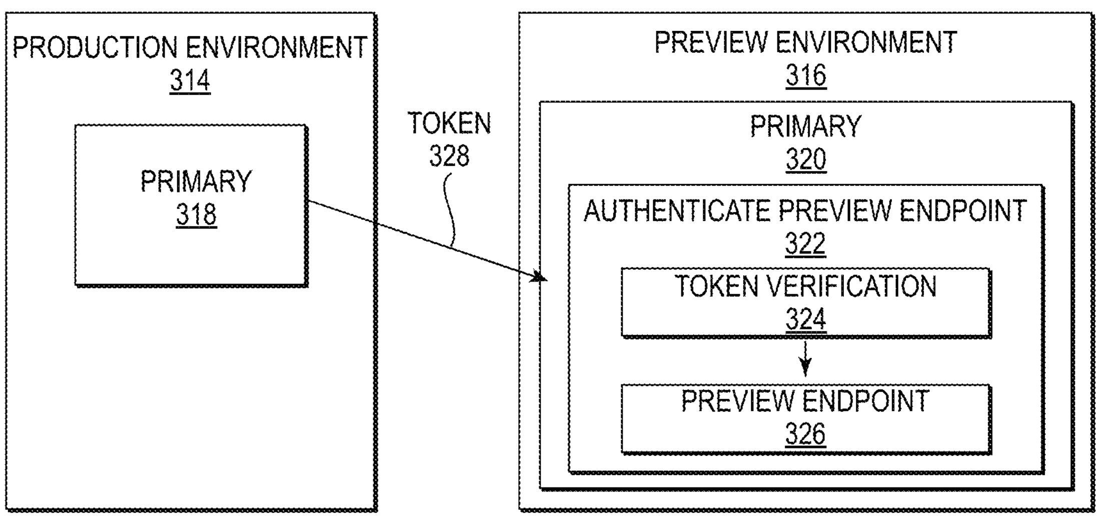

FIGS. 3A and 3B depict block diagrams of production and preview environments for generating and verifying sandboxes with computing systems that develop and execute the sandboxes for large-scale workforce management platforms, according to example embodiments of the present disclosure. With respect to FIG. 3A, a production environment 302 can be communicatively coupled to a preview environment 304. The production environment 302 can be utilized to manage a customer sandbox application 306, which can be accessed via a uniform resource locator (URL) (e.g., "XX.com"). The customer sandbox application 306 can be utilized to implement the sandbox 108, as discussed above with reference to FIG. 1. One or more computing devices (e.g., the computing device(s) in the platform 102, as discussed above with reference to FIG. 1) can be utilized to manage the production environment 302 and/or the preview environment 304.

The preview environment 304 can be utilized to manage one or more preview instances, such as a preview instance (e.g., a preview instance with an identifier: XX01) 308 and/or a preview instance (e.g., a preview instance with an identifier: XX02) 310. The identifier(s) of the preview instance can identify the sandbox to which the preview instance(s) 308/310 correspond. A preview instance can include an infrastructure abstraction that supports a sandbox model (e.g., the sandbox). Preview instances are 1:1 with customer sandboxes. Any sandbox can include a corresponding preview instance in the preview environment 304. In some examples, individual ones of the preview instance(s) 308/310 can be utilized to implement, and/or can be implemented via, corresponding sandbox instances. For instance, the preview instance 308 can be utilized to implement, and/or can be implemented via the sandbox instance 112.

The production environment 302 can be communicatively coupled to the preview environment 304, via a single sign-on (SSO) 312. For example, one or more communications exchanged between the production environment 302 and the preview environment 304 can be facilitated by the SSO 312.

The production environment 302 can be an operational environment where one or more applications and one or more systems are executed. The application(s) and/or the system(s) may be executed for their intended, live use by end-users. The production environment 302 can host the application(s), which can include one or more customer sandbox applications (e.g., the customer sandbox application 306). The production environment 302 can be associated with the network domain, for example, "XX.COM". The customer sandbox application 306 can be a software program accessible by one or more users (e.g., the user(s) 136). For example, the customer sandbox application 306 may provide an interface for managing a sandbox, the preview environment 304, and/or the preview instance 308.

The preview environment 304 can include a non-production computing environment used for purposes such as testing, validation, and/or demonstrating new features before deployment to the production environment 302. Individual ones of the preview instance(s) 308/310 can include and/or utilize a specific, isolated copy of a system, application, and/or database. Each instance can be associated with a unique identifier. For example, a preview instance can have a unique identifiers that corresponds on a 1:1 basis with a sandbox identifier in the preview environment 304. In such an example or another example, the preview instance can include a well-defined status that indicates a state of the preview instance in the preview environment 304.

The SSO 312 can include an authentication scheme that allows a user (e.g., any of the user(s) 136) to log in with a single set of one or more credentials to multiple independent software systems. For example, the SSO 312 can be used to authenticate the user 136 from the production environment 302 to access resources within the preview environment 304 (e.g., via the preview instance(s) 308/310).

With respect to FIG. 3B, a production environment 314 can be communicatively coupled to a preview environment 316. The production environment 314 and the preview environment 316 can be utilized to implement, and/or can be implemented via, the production environment 302 and the preview environment 304, respectively. The production environment 314 can be utilized to make one or more secure API calls (e.g., one or more API requests) to the preview environment 316. An API can provide a set of one or more rules and/or one or more protocols to enable the customer sandbox application 306 to communicate and/or interact with the preview instance 308.

The production environment 314 can include a primary application (or "primary") 318, such as a production application. The primary application 318 in production can interface with the preview environment 316 via the API request(s).

The preview environment 316 can be utilized by the primary application 318 as a primary application 320, and via one or more endpoints. The preview environment can include an infrastructure environment accessible to the user(s) 136 (e.g., such as the customer(s) 140). The endpoint(s) can include an authenticate preview endpoint 322 with token verification 324 for a preview endpoint 326. An endpoint can be used as the preview endpoint 322 based on a decorator for authentication. The preview endpoint 322 only serves requests in the preview environment 316.

The preview endpoint 326 can include one or more views in the primary application that are, in some instances, only valid and serve the request(s) in the preview endpoint 326. In some cases, the preview endpoint 326 only trusts API calls that are made via a token 328, and/or signed by a private key. The authenticate preview endpoint 322 identifies whether to trust the API call via verification of the token 328 with a token verification 324. The preview endpoint 326 does not pass personal and/or private information. Authentication via the authentication preview endpoint 322 can be performed utilizing code, as follows:

```
@require_http_methods(["POST"]) (1)
@csrf_exempt
@unsafe_exposed_to_public
@authenticate_preview_endpoint
def my_preview_endpoint(request):
  . . .
```

The customer sandbox application (also referred to herein simply as "sandbox") 306, which may be for the primary application 318, can be configured to prevent actions in the sandbox environment from affecting the production infrastructure. The sandbox 306 can be utilized to avoid effects to data/information (e.g., text files, images, videos, etc.,) within a cloud, shared kafka queues, production datastores, etc., or any combination thereof. The sandbox 306 can be utilized to prevent unintentional actions outside of the system, such as by preventing sending of emails, running of payroll, transferring of money, etc. Preventing unintentional actions outside of the system can be achieved by blocking all egress network access and configuring a domain allowlist. The domain allowlist can be utilized to ensure that requests are not accidentally sent to third parties. This can prevent unintentional side effects from occurring. Teams can properly configure their products and network allowlists to enable the allowlist to block desired requests.

The sandbox 306 can be configured to utilize an allowlist for certain external actions. The allowlist can be configured to allow actions in a certain sandbox environment to affect the outside world only if requested by the customer for the sandbox 306. Preventing unintended actions from affecting the outside world can be achieved by utilizing the egress gateway proxy. The domains allowed here can be decided by the customer sandbox administrator.

FIG. 4 depicts a block diagram of production and preview environments for managing sandboxes with computing systems that develop and execute the sandboxes for large-scale workforce management platforms, according to example embodiments of the present disclosure. A production environment 402 can be communicatively coupled to a preview environment 404. In some examples, the production environment 402 and/or the preview environment 404 can be implemented via, and/or utilized to implement, the production environment 302 and/or the preview environment 304, respectively.

The production environment 402 can include application content 406, hardware content 408, one or more other types of content, time-tracking content 410, or any combination thereof. The application content 406 can include any content associated with the application 104, and/or the application(s) 106, as discussed above with reference to FIG. 1. The hardware content 408 can include any content associated with hardware in one or more platforms (e.g., the platform 102, as discussed above with reference to FIG. 1), and/or the computing device(s) therein. The time-tracking content 410 can include any content utilized to identify any time-related data and/or information associated with sandboxes/sandbox instances (e.g., the sandbox 108, the sandbox(es) 110, the sandbox instance 112, the sandbox instance(s) 114, as discussed above with reference to FIG. 1), one or more other portions of the platform 102, or any combination thereof. The time-related data and/or information may be associated with logins, sandbox instance refreshes, etc., or any other operations/actions associated with the platform 102.

The preview environment 404 can include various types of content associated with various numbers and/or types of clusters. The clusters can include, for example, a base cluster 412, a preview cluster 1 414, one or more other clusters, and a preview cluster N 416. The content associated with the clusters can include content associated with the base cluster 412, content associated with the preview cluster 1 414, and/or one or more other types of content, such as content associated with the preview cluster N 416. The content associated with the base cluster 412 may be associated with preview content 418. The content associated with the preview cluster 1 414 may be associated with preview content 420. The content associated with a preview cluster N 416 may be associated with preview content 422.

Egress network access for the preview content (e.g., the preview content 420/422) can be prevented utilizing a domain allowlist. The domain allowlist can be utilized to block requests sent to third parties with a sandbox instance (e.g., the sandbox instance 112). Unintentional side effects can be avoided by blocking third-party requests. A network proxy can be utilized along with auditing traffic to determine a set of domains being requested. Based on any domains not being in the domain allowlist, traffic can be blocked to such domains.

Various levels of isolation can be utilized for one or more database of the preview environment 404. The isolation levels can include physical cluster isolation and logical database isolation. Individual clusters (e.g., of logical databases) can be managed utilizing the database(s). Corresponding databases associated with individual clusters can include a core database storing a set of collections (e.g., collections of databases) and a history database storing a set of collections (e.g., collections of databases).

Models associated with sandboxes (e.g., the sandbox 108) can be connected to databases. Aliases can be utilized for corresponding models (e.g., models that include, and/or are associated with, corresponding sandboxes). Aliases can identify which models should connect to which databases to access collection data in the databases. An alias can include connection settings in which a URL (e.g., associated with the model) and one or more other settings are defined. The URL can include a location and/or a physical cluster (e.g., the preview cluster 1 414, the other preview cluster(s), the preview cluster N 416, etc.) and a logical database to which a model connects.

At startup of an application (e.g., the application 306), an alias for the application 306 can be registered. One or more connections for the application 306 can be registered at startup of the application 306. The existence of aliases and connections associated therewith can be registered via execution of the application. Connections (e.g., to corresponding API workers) can be opened lazily as queries are made and as connections are needed for the application being requested. Connections can be subsequently terminated.

Customer data for the preview environment 404 can be isolated at the logical database level. The base preview cluster 412 can store configuration data about the preview environment 404. The base preview cluster 412 not storing customer data can be utilized to achieve isolation for the sandboxes (e.g., associated with the preview content 420-422). The configuration data stored in the base preview cluster 412 can include data utilized to identify a cluster to which any preview instance (e.g., any of the preview instance(s) 308/310, as discussed above with reference to FIG. 3A) associated with preview content (e.g., the preview content 420/422, respectively) is assigned. The base preview cluster 412 can store data utilized to identify a preview cluster (e.g., the preview cluster 1 414/N 416) to which preview content (e.g., the preview content 420/422, respectively) is assigned.

Any number of preview clusters can be utilized to store actual preview instance database data. Each preview cluster can store a number (e.g., 10) of logical databases that include data identifying all collections and identifiers, such as indexes (e.g., indexes associated with aliases that identify connections between models and databases).

While a preview cluster can store the number (e.g., 10) of logical databases as discussed above in the current disclosure, it is not limited as such. In some examples, a preview cluster can store any number (e.g., 5, 10, 20, 50) of logical databases. Individual ones of the logical databases in any of the preview clusters can include i) data of only corresponding customer but no data associated with any other customer, and ii) data identifying all relevant collections (e.g., collections of logical databases) and relevant models (e.g., sandbox models). Each logical database in the corresponding preview cluster may include, and/or correspond to, a separate customer preview instance's data.

The aliasing can be utilized to manage the queries for the models (e.g., sandbox models). In some examples, a request for a single preview instance (e.g., the preview instance 308, as discussed above with reference to FIG. 3), with which the preview content (e.g., the preview content 420, as discussed above with reference to FIG. 4) may be associated, can be received. The request, which may be associated with a model (e.g., a model with which the sandbox 108 is associated), may be received from a device of a customer. There may be multiple databases associated with that model. Data for that preview instance 308 can be provided but no data for any other preview instance. The alias, which may map the model and the databases corresponding thereto, can be utilized to respond to the query with data in the database corresponding to the model.

A single alias, in some cases, can possibly be utilized to connect a model to a logical database. However, in alternative cases, a same number of aliases is used for mapping models to aliases for connecting databases. In various examples, upon receiving, by one or more computing devices (e.g., computing device(s) in the platform 102), a request intended for a particular preview instance, the computing device(s) can perform one or more operations on-demand based on the received request. For instance, the computing device(s), upon receiving the request, can i) verify validity of an identifier of a preview instance (e.g., any of the preview instance(s) 308/310) and then register all aliases and connections for this preview instance. In such an instance, upon receiving the request, the computing device(s) can ii) exchange communications with all models to identify one or more corresponding aliases (e.g., identified based on the request) and open a connection to a corresponding logical database (e.g., identified based on the request and the corresponding aliases) for a device of a user from which the request is received.

Aliases (e.g., 180 aliases, or any number of aliases) can be registered for each preview instance, in some cases). For example, aliases can be registered relatively quickly upon startup of an application (e.g., and/or provisioning of a sandbox). Because aliases can be registered relatively quickly (e.g., with a threshold period of time), establishing database connections based on requests can be performed lazily with the databases. Establishment of database connections can be a separate and/or different process from registration. Establishing the connections lazily (e.g., based on registration having been previously performed) can enable the data connections to be performed with relatively minimal delays when requests are received (e.g., based on registration being performed previously). In some instances, open connections can possibly be closed after serving a preview request (e.g., such as by switching from a total number of aliases per preview instance to a relatively smaller number of aliases, or to a single alias per preview instance), which could result in performance improvements.

One or more clusters (e.g., one or more new preview clusters) can be provisioned automatically based on a number of logical databases in any existing cluster approaching a threshold (e.g., a threshold number of logical databases, such as 10 logical databases). The identifiers of the clusters (e.g., the clusters 1 414-N 416) and capacities of the clusters can be stored for models associated with preview clusters. For example, the identifiers and capacities of the clusters can be stored in the base preview cluster (e.g., the base cluster 412). Collections associated with the preview clusters can be queried by the computing device(s) periodically. One or more autoscaling rules can be utilized to determine when to provision the clusters. Clusters can be provisioned dynamically based on an autoscaling rule (e.g., a rule associated with the threshold number of logical databases) being triggered.

One or more API requests (e.g., the API request(s) used to interface between the primary application 318 and the preview environment 316, as discussed above with reference to FIG. 3) can be utilized to connect a preview endpoint with a default database of the preview environment 316. A request, by default, can be sent using a domain associated with the platform 102 to connect the preview endpoint with the default database. The default database may include no data associated with any preview instance. The default database may include infra-level information associated with all preview instances in the preview environment 316.

In some examples, for an endpoint to be operated at an infra-level, a request can be sent to an application subdomain to determine a list of all valid preview instances. In other examples, for an endpoint to be operated at a preview instance level, a request can be sent using a preview identifier as a subdomain. The request for the endpoint to be operated at the preview instance level can be used to generate data in a single preview instance by connecting to a database specific to that preview instance. In other examples, for an endpoint to be operated on all preview instances, a request can be sent using a domain associated with the platform 102. In another example, for an endpoint to be operated on a single preview instance, a request can be sent using a domain associated with a corresponding preview instance identifier.

Data modeling processes can be utilized for sandbox instances in various ways. For example, data modeling can be performed utilizing code, as follows:

```
Id: ObjectId (2)
name: String
description: String
spoke_owner: SpokeOwner
staff_user_spoke_owner: SpokeOwner
```

```
preview_id: String
company: Company reference
containing_company_ids: list of Company ids
type: Choice
createdAt: DateTime
updatedAt: DateTime
isDeleted: bool
created_by: RWC reference.
```

Data refresh processes can be utilized for sandbox instances in various ways. For example, data refresh can be performed utilizing code, as follows:

```
Id: ObjectId (3)
sandbox_instance: SandboxInstance reference
status: Choice
type: Choice:
start_time: Datetime
end_time: DateTime
scheduled_eta_id:
created_by: RWC reference
createdAt: DateTime
updatedAt: DateTime
isDeleted: bool.
```

Session history processes can be utilized for sandbox instances in various ways. For example, session refresh processes can be performed utilizing code, as follows:

```
src_role: RWC reference (4)
dst_role: RWC reference
start_time: DateTime
reason: String
```

Preview instance processes can be utilized for sandbox instances in various ways. For example, preview instance processes can be performed utilizing code, as follows:

```
Id: ObjectId (5)
preview_instance_id: String
status: Choice
preview_mongo_cluster: PreviewMongoCluster
version: Integer
meta_data: Dict
createdAt: DateTime
updatedAt: DateTime
isDeleted: bool
```

Cluster processes can be utilized for sandbox instances in various ways. For example, preview cluster processes can be performed utilizing code, as follows:

```
Id: ObjectId (6)
preview_instance_count: Integer
mongo_url: String
mongo_read_only_url: String
createdAt: DateTime
updatedAt: DateTime
isDeleted: bool
```

Preview data refresh processes can be utilized for sandbox instances in various ways. For example, preview data refresh processes can be performed utilizing code, as follows:

```
Id: ObjectId (7)
preview_instance_id: String
restore_params: Dict
createdAt: DateTime
updatedAt: DateTime
isDeleted: bool
```

Sandbox instance processes for API endpoints can be utilized in various ways. For example, sandbox instance processes for API endpoints can be performed utilizing code, as follows:

```
POST api/customer_sandbox/sandbox_instance (8)
  Payload
    name
    description
    company
    spoke_owner
  Response
    Response <SandboxInstance>
GET(LIST) api/customer_sandbox/sandbox_instance
  Query params:
    List[Id](optional)
  Response
    Response <List[SandboxInstance]>
GET api/customer_sandbox/sandbox_instance/<id>
  Response <SandboxInstance>
PUT api/customer_sandbox/sandbox_instance/<id>
  Payload
    name
    description
  Response
    Response <SandboxInstance>
```

Data refresh processes for API endpoints can be utilized in various ways. For example, data refresh processes for API endpoints can be performed utilizing code, as follows:

```
POST api/customer_sandbox/sandbox_instance/<id>/data_refresh/ (9)
  Payload
    type
    start_time # if scheduled
  Response
    Response <DataRefresh>
DELETE api/customer_sandbox/sandbox_instance/<id>/data_refresh/
  Response
    Response <200>.
```

Session history processes for API endpoints can be utilized in various ways. For example, session history processes for API endpoints can be performed utilizing code, as follows:

```
POST api/customer_sandbox/sandbox_instance/<id>/session_history/ (10)
  payload
    dst_role
    reason # required if dst_role !=request making role
      (src_role), i.e., login-as scenario
  response
    Response <SessionHistory>
GET api/customer_sandbox/sandbox_instance/<id>/session_history/
  response
    Response <List[SessionHistory]>.
```

In a hypothetical example, sandbox provisioning can be performed for customers (e.g., any of the customer(s) 140, as discussed above with reference to FIG. 1). Flags for a sandbox can be enabled to begin provisioning the sandbox. For the flags (e.g., two flags), a company target can be updated with an identifier of a demo company that a customer would like to test via the sandbox. One or more computing devices utilized to perform sandbox provisioning can be proxied into the demo company. A customer device being utilized to request sandbox provisioning can proxy into a demo company and navigate to one or more active links to install a sandbox by providing one or more selections via user input to request installation.

In the hypothetical, while the customer device is proxied into the demo company, a customer can navigate to a dashboard overview for the sandbox and select to generate a new sandbox. The customer can input a unique name like "My sandbox." The customer can set up rules for which new hires or transitions (e.g., employees transitioning with the company) should get an account. The customer can watch the sandbox being provisioned and/or statuses therefore, until a status is "Ready."

In the hypothetical, the customer can directly login to the demo company with credentials previously generated by the customer. At this time, the proxy will be inaccessible since the customer is blocked from using SSO while proxied in. The customer can navigate to the sandbox product that was provisioned and select login. The customer can also access the sandbox as a staff, via a staff user access. The customer can use this feature to proxy and debug customer issues.

In the hypothetical, the customer can view details associated with the sandbox. The customer can view sandbox settings, such as the sandbox name, the description of the sandbox, the created on date and the created by name, etc., or any combination thereof. The customer can view data refresh details, such as a last refreshed on date and a last refreshed by name. The customer can view refresh history details. The customer can view details in a list of previous refreshes. For a previous refresh, details being presented can include a name of the user that performed the refresh, a refresh started at data/time, a refresh completed date/time, a refresh type (e.g., manual refresh, automated refresh, etc.), a refresh status (e.g., a ready status), etc., or any combination thereof.

In the hypothetical, the customer can view access history details. For the access history, various information can be provided such as a name of the sandbox, a last access name, etc., or any combination thereof. The access history details can include a username of a user that accessed the sandbox, an access date/time, etc., or any combination thereof.

In another hypothetical example, various features can be provided to process and/or manage a sandbox application. Sandbox application provisioning can be performed using a feature flag. The feature flag can be presented in a portion of the sandbox application (e.g., a left navigation and global search bar) if it is enabled. The sandbox application can utilize a retool endpoint to set a per-company sandbox instance number limit.

In the hypothetical example, a sandbox instance overview page can include an application landing page/dashboard. The sandbox instance overview page can include all sandbox instances of a company in a table. The table can include a name column and a type column. The table can include a status column. The status column can be utilized for polling of APIs. The status column can show a creation status and a last refresh status. The sandbox instance overview page can include, for the last refresh column, a created time if a sandbox has been created for the first time, and, otherwise, a last refresh time. The sandbox instance overview page can include a next refresh column, which can be blank if there has been no manual scheduled time. The next refresh column can include, if a current time is within a threshold (e.g., 24 hours) of a next scheduled refresh a warning if a user tries to login or to use login-as. The warning can cancel a refresh, or, possibly, continue to login or login-as.

In the hypothetical example, the sandbox instance overview page can include a next sandbox button that is selectable by a customer to start sandbox instance creation. Creation of the sandbox instance can be performed according to an application installation flow. The application installation flow for sandbox instance creation can be performed using a page to obtain user input on a sandbox name and description. The application installation flow for sandbox instance creation can be performed using another page to set up a provisioning group. The sandbox instance overview page can be utilized to generate sandbox instances within a company. The sandbox instances can have unique names. The sandbox instance creation can be performed to track and present, on the overview page, a name, type, status, and last refresh of the sandbox instance. A snack bar can be presented to show a triggered value. Permission can be required for the customer to access sandbox instance creation. The permission required can include super permissions, full permissions, sandbox administer permissions, or any combination thereof. The user (e.g., customer) can receive an email after the sandbox instance has been successfully created.

In the hypothetical example, the sandbox instance overview page can enable a customer to log in to the sandbox instance as themselves. Newly-created sandbox instances can be provisioned. A login button can enable the user to access the particular sandbox instance's environment. A top-of-viewport status bar (e.g., a blue bar) can be presented. The log in can be enabled subject to a sandbox instance level permission, as discussed below in further detail. The log in can be made unavailable of the sandbox is being created or refreshed based on the status.

In the hypothetical example, the sandbox instance overview page can enable the user to log in to the sandbox instance as another employee. The user, such as a super administrator or a full administrator, can login by choosing from a dropdown of all employees in the company. The dropdown may be supported by a search endpoint feature. The sandbox application administrator can be blocked from using the log in as feature. The log in as feature can request a log-in-as reason. A status can be reflected in the top-of-viewport navigation bar. An impersonating administrator can be blocked from seeing information of an impersonated employee they would otherwise be unable to see without impersonation.

In the hypothetical example, the sandbox application level permission can enable anyone to open the sandbox application. The options available to the user for the application can be subject to both the application-level and the instance-level permission. Super/full administrators can have all privileges within the sandbox application. The privileges of the super/full administrators can enable the administrators to create, edit, and/or refresh the sandbox instance, to update the provisioning group on the sandbox instance, and to use the log-in-as feature. The sandbox application administrators can have all privileges within the sandbox application except for one, which can include the privilege to use the log-in-as feature. The super/full administrators can use the permissions application to create a sandbox application administrators permission profile. The sandbox application administrators permission profile can control the scope of the sandbox application service. User assigned to this permission profile can become the sandbox application administrators. There is no need, therefore, to have fine-grained privileges within the permissions application for the sandbox (e.g., an activity log can be used).

In the hypothetical example, a sandbox instance detailed view can include a page for each sandbox instance. The detailed view can include an overview tab and an access rules tab. The tabs can allow the sandbox instance's provisioning group to be edited. Super/full/sandbox application administrators can control who can log into the sandbox view on the tabs. The access rules tab can possibly show only a section for who should get an account (e.g., but possibly not who should automatically get access to the sandbox when they join the company). A history tab can show log-in and log-in-as history tracking to keep track of the user, log-in-as user, date, and reason, in a history table.

In the hypothetical example, the page for each sandbox instance can include a data refresh tab. The data refresh tab can be utilized to show a last refreshed on date and last refreshed by name. The status of "refreshing" can be shown if the instance is being created or refreshed. A selectable button can be presented for refresh now or schedule refresh. The snackbar can show on-demand or scheduled refreshes that are successfully triggered. The button to refresh now or schedule refresh can be disabled if the instance was refreshed within a threshold period of time (e.g., within the last 24 hours) and/or if refreshing is being performed. The last refresh and next refresh can be supported on the dashboard page. Details about a scheduled refresh can be shown if a pending refresh has been scheduled. A cancel scheduled refresh button can be presented (e.g., such as by changing another button, such as the continue to log-in-as button to be the cancel scheduled refresh button). The refresh scheduled details for a scheduled refresh can be presented, such as a refresh scheduled for date and a refresh scheduled by name. Availability to the data refresh tab can be controlled to require the super/full/sandbox administrator permissions. The user can receive an email once the refresh has been successfully completed.

In the hypothetical example, the page for each sandbox instance can include a settings tab. The settings tab can include a sandbox instance sub-tab. The sub-tab can be utilized to show a name, a description, a created time, and a created by name. The sub-tab can be utilized to show an edit name and description. Availability to the settings tab can be controlled to require the super/full/sandbox administrator permissions.

Figure 5:
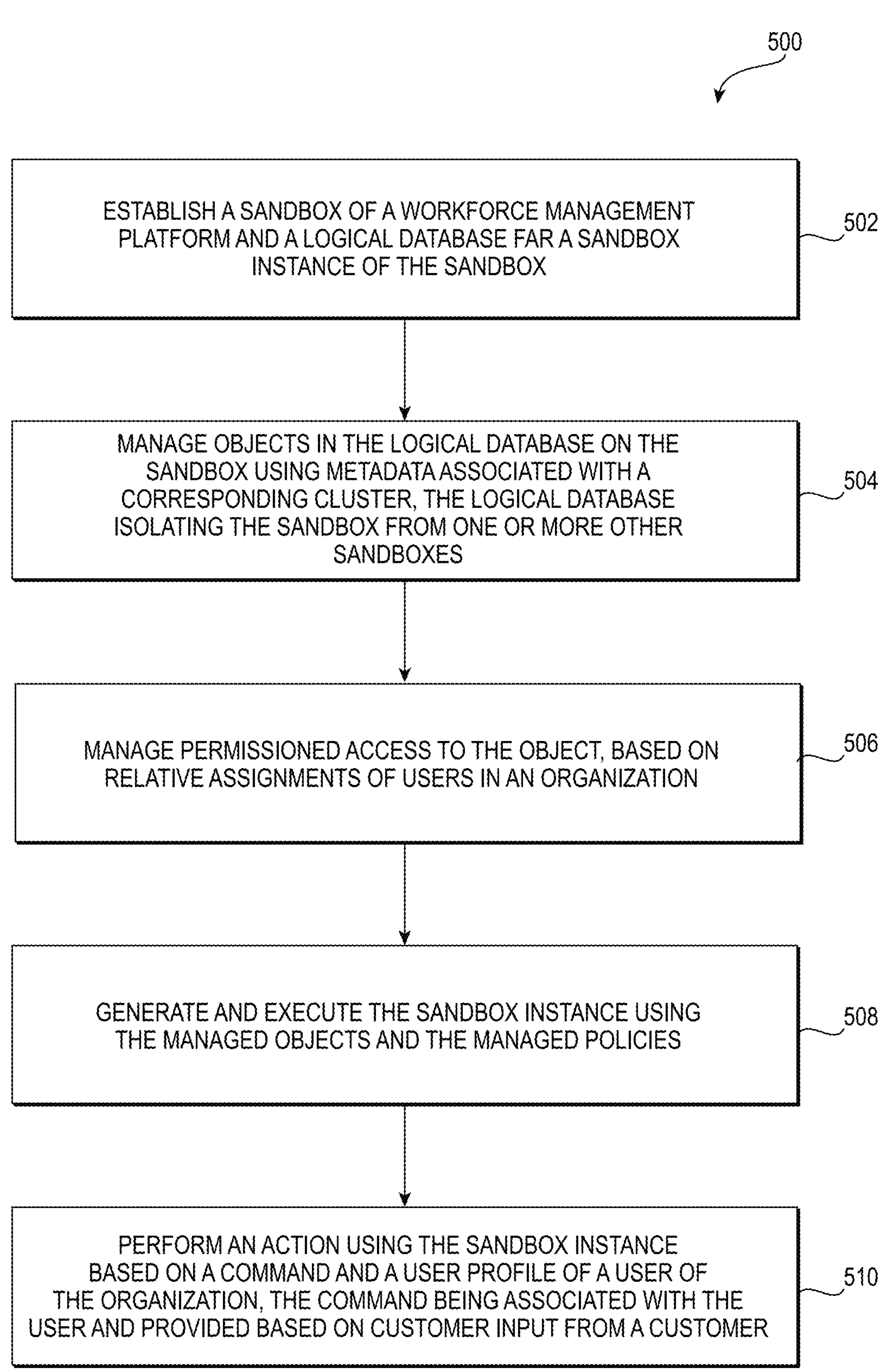
FIG. 5 depicts a flow diagram of an example method for managing sandboxes with computing systems that develop and execute the sandboxes for large-scale workforce management platforms, according to example embodiments of the present disclosure.

FIG. 5 depicts a flow diagram of an example method 500 for managing sandboxes with computing systems that develop and execute the sandboxes for large-scale workforce management platforms, according to example embodiments of the present disclosure. One or more portions of the method 500 can be executed and/or implemented on one or more computing devices or computing systems including, for example, the platform 102, and/or the computing device (s) associated therewith. Further, one or more portions of the method 500 can be executed and/or implemented as an algorithm and/or as machine-readable instructions (e.g., computer software) on the hardware devices and/or systems disclosed herein. FIG. 5 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 502, the method 500 can include establishing a sandbox of a workforce management platform and a logical database for a sandbox instance of the sandbox. The sandbox can include the sandbox 108. The sandbox instance can include the sandbox instance 112. The logical database can include the logical database 116. The sandbox instance 112 can be provisioned according to states in the state machine 200 to establish the sandbox 108 with the sandbox instance 112.

At 504, the method 500 can include managing objects in the logical database of the sandbox using metadata associated with a corresponding cluster, the logical database isolating the sandbox from one or more other sandboxes. The objects can include the object(s) 118 in the logical database 116. The metadata, which can be associated with a cluster that includes the sandbox 108 and/or collections of databases, therefore, can include the metadata 122 and/or the metadata 124.

At 506, the method 500 can include managing permissioned access to the objects, based on relative assignments of users in an organization. Permissioned access to the object(s) 118 can be controlled using the sandbox instance 112. The access can be controlled based on relative assignments of the user(s) 136. The access can be controlled based on requests from the user(s) 136.

At 508, the method 500 can include generating and executing the sandbox instance of the sandbox using the managed objects and the managed permissioned access. The sandbox instance 112 can be executed using the objects and the permissioned access. Requests from the user(s) 136 can be granted or denied using permissions of the user(s) 136 based on their requests.

At 510, the method 500 can include performing an action using the sandbox instance based on a command and a user profile of a user of the organization, the command being associated with the user and provided based on customer input from a customer. The user profile of a user 136 can be utilized to identify the permissions. The user 136 making the request, such as a request to login-as another member of the organization can be granted if the user has sufficient privileges for the request.

Figure 6:
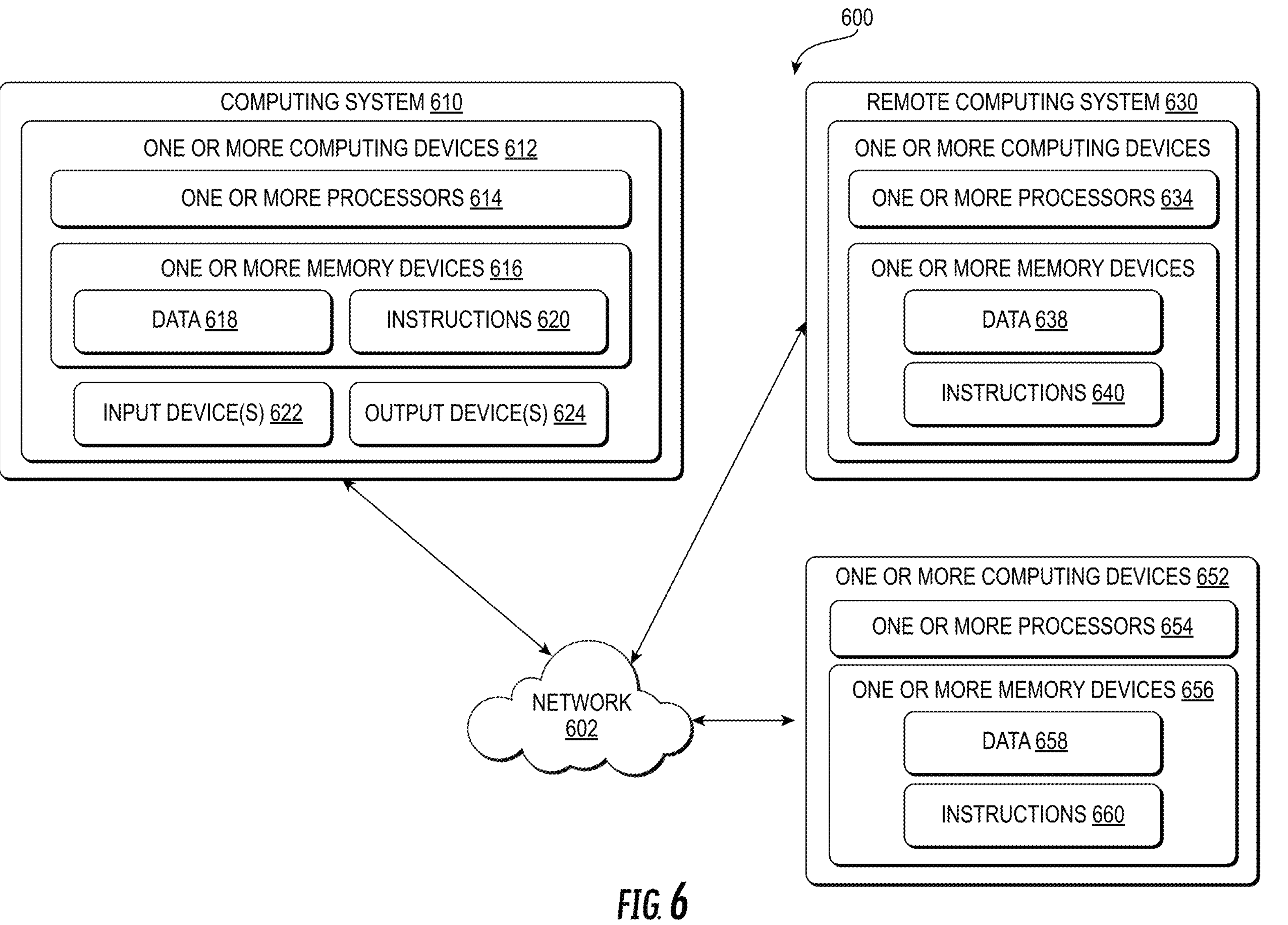
FIG. 6 depicts a block diagram of an example, non-limiting computing environment that can facilitate managing sandboxes in accordance with one or more example embodiments of the present disclosure.

FIG. 6 depicts a block diagram of an example, non-limiting computing environment 600 that can facilitate managing sandboxes in accordance with one or more example embodiments of the present disclosure. The example environment 600 can include a computing system 610 that performs operations according to example embodiments of the present disclosure. The computing system 610 can be utilized to implement the platform 102, as discussed above with reference to FIG. 1. The environment 600 includes a network 602, a computing system 610, one or more computing devices 612, one or more processors 614, one or more memory devices 616, data 618, instructions 620, a remote computing system 630, one or more computing devices 632, one or more processors 634, one or more memory devices 636, data 638, instructions 640, one or more computing devices 652, one or more processors 654, one or more memory devices 656, data 658, and instructions 660. Individual ones of the remote computing device(s) 630 may represent corresponding devices associated with one or more third-party devices of one or more third-parties. Individual ones of the computing device(s) 652 can be utilized to implement corresponding devices associated with one or more devices of the user(s) 136, as discussed above with reference to FIG. 1.

The network 602 can include any type of communications network. For example, the network 602 can include a local area network (LAN), a wide area network (WAN), an intranet, an extranet, and/or the internet. Further, the network 602 can include any number of wired or wireless connections and/or links that can be used to communicate with one or more computing systems (e.g., the computing system 610 and/or the remote computing system 630) and/or one or more devices (e.g., the one or more computing devices 652). Communication over the network 602 can be performed via any type of wired and/or wireless connection and can use a wide variety of communication protocols (e.g., transmission control protocol/internet protocol (TCP/IP), hypertext transfer protocol (HTTP), simple mail transfer protocol (SMTP), file transfer protocol (FTP)), encodings or formats (e.g., (hypertext markup language (HTML, XML), and/or protection schemes (e.g., virtual private network (VPN), secure HTTP, secure sockets layer (SSL)).

The computing system 610 can include any combination of systems and/or devices including one or more computing systems (not shown) and/or one or more computing devices 612. Further, the computing system 610 may be connected (e.g., networked) to one or more computing systems (e.g., remote computing system 630) and/or one or more computing devices (e.g., one or more computing devices 632, 652) via the network 602. The computing system 610 may operate in various different configurations including as a server or a client machine in a client-server network environment, or as a peer machine in a peer-to-peer (or distributed) network environment. Though the computing system 610 is depicted in FIG. 6 as a single device, the computing system 610 can include any collection or combination of devices that individually or in combination with other devices, execute a set of one or more instructions to perform any one or more of the operations discussed herein.

In this example, the computing system 610 includes the one or more computing devices 612. The one or more computing devices 612 can include any type of computing device. For example, the one or more computing devices 612 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 610 or any of the constituent components and/or devices of the computing system 610.

Any of the one or more computing devices 612 can include the one or more processors 614. The one or more processors 614 can include any processing device (e.g., a processor core, a microprocessor, an application specific integrated circuit (ASIC), a field programmable gate array (FPGA), a controller, or a microcontroller) and can include one processor or multiple processors that may be operatively connected. In some embodiments, the one or more processors 614 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 612 can include the one or more memory devices 616. The one or more memory devices 616 can be used to store data and/or information and can include one or more computer-readable media, one or more non-transitory computer-readable storage media, and/or one or more machine-readable media. Though the one or more memory devices 616 are depicted in FIG. 6 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 616 can include any combination of random-access memory (RAM), read-only memory (ROM), EEPROM, EPROM, one or more flash memory devices, and/or one or more magnetic storage devices (e.g., one or more hard disk drives).

The one or more processors 614 can be configured to execute one or more instructions to perform the operations described herein including, for example, one or more operations associated with performing multilayered generation and processing of computer instructions in association with a custom query language (e.g., a custom query language for use with organizational data) across various types of applications and/or computer systems. Further, the one or more memory devices 616 can store the data 618 and/or the instructions 620, which can be executed by the one or more processors 614 to cause the one or more computing devices 612 to perform one or more operations. For example, the one or more operations performed by the one or more processors 614 can include receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more generated instructions in the second computing language, and providing the result in response to the request comprising the one or more instructions in the first computer language, etc.

The data 618 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), data that includes instructions in a custom computer language (e.g., a custom query language based on organizational data), data that includes rules associated with the custom computer language, and/or other types of data. Further, the instructions 620 can include one or more instructions to use data including the data 618 to perform any one or more of the various operations described herein. In some embodiments, the one or more memory devices 616 can be used to store one or more applications that can be operated by the one or more processors 614. The data 618, the instructions 620, and/or the one or more applications can be associated with an organization. Further, the computing system 610 may be associated with an organization and may be configured to manage the one or more applications. For example, the computing system 610 can perform one or more operations associated with authenticating one or more users that attempt to access the one or more applications which can include one or more third-party applications, which may be remote from the computing system 610.

Any of the one or more computing devices 612 can include one or more input devices 622 and/or one or more output devices 624. The one or more input devices 622 can be configured to receive input (e.g., user input) and can include one or more touch screens, one or more keyboards, one or more pointing devices, (e.g., mouse device), one or more buttons, one or more microphones, and/or one or more cameras. The one or more output devices 624 can include one or more display devices, one or more loudspeaker devices, one or more haptic output devices. By way of example, the one or more output devices 624 can be used to display a graphical user interface via a display device that can include a touch screen layer that is configured to detect one or more inputs (e.g., one or more user inputs). The one or more processors 614 may perform one or more operations (e.g., operations associated with performing multilayered generation and processing of computer instructions) based at least in part on the one or more inputs.

The remote computing system 630 includes the one or more computing devices 632. Each of the one or more computing devices 632 can include one or more processors 634, one or more memory devices 636, the data 638, and/or the instructions 640. The remote computing system 630 can include any of the attributes and/or capabilities of the computing system 610. Further, the remote computing system 630 can communicate with one or more devices and/or one or more systems via the network 602.

In some embodiments, the remote computing system 630 can include one or more applications (e.g., computer software applications comprising computer instructions) that can be stored and/or executed by the remote computing system 630. Further, the one or more applications can include one or more third-party applications that may be accessed from the computing system 610 and which are at least partly operated from the remote computing system 630. The one or more third-party applications may be associated with and provided by an organization that is different from the organization that is associated with the computing system 610. Further, the data 638 can include one or more portions of the organizational data (e.g., one or more organizational records), one or more data structures associated with the organizational data, rule data, organizational policy data, application policy data, third-party integration data, and/or other types of data.

One or more computing devices 652 (e.g., user devices or any other types of devices) can include one or more processors 654, one or more memory devices 656, the data 658, and/or the instructions 660. Such one or more computing devices 652 may include any of the attributes and/or capabilities of the one or more computing devices 612, 632. Further, such one or more computing devices 652 can communicate with one or more devices and/or one or more systems via the network 602.

In some embodiments, the one or more computing devices 652 can include one or more applications (e.g., computer software applications comprising computer instructions) that can be stored and/or executed by such one or more computing devices 652. Further, the one or more applications can include one or more third-party applications that may be accessed from the one or more computing devices 652 and which are at least partly operated from such one or more computing devices 652. Data 638 may include, for example, one or more portions of the organizational data (e.g., one or more organizational records), one or more data structures associated with the organizational data, rule data, organizational policy data, application policy data, third-party integration data (e.g., third-party application integration data), and/or other types of data.

Figure 7:
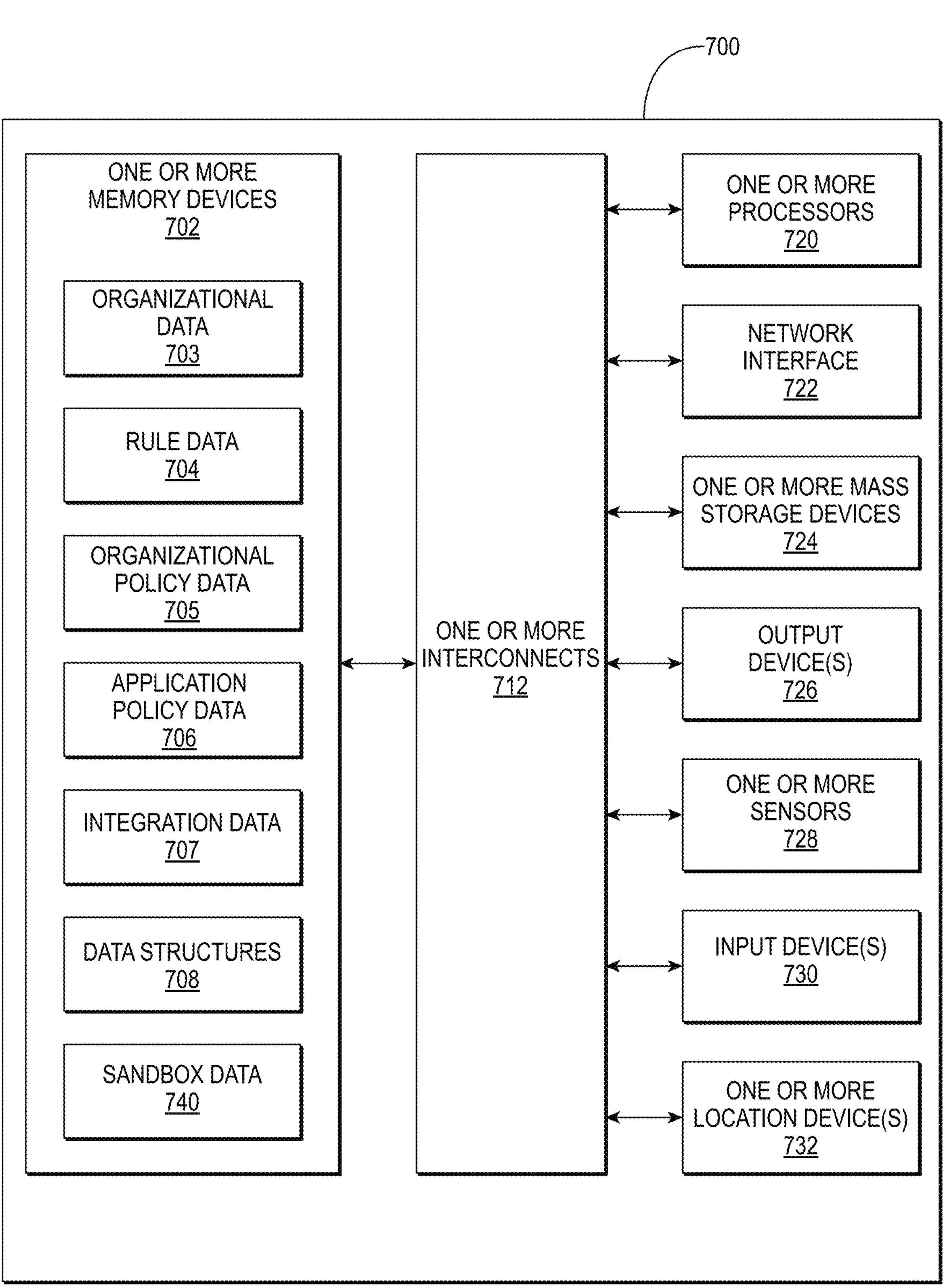
FIG. 7 depicts a block diagram of an example, non-limiting computing device that can facilitate managing sandboxes with computing systems that develop and execute the sandboxes for large-scale workforce management platforms in accordance with one or more example embodiments of the present disclosure.

FIG. 7 depicts a block diagram of an example, non-limiting computing device 700 that can facilitate managing sandboxes with computing systems that develop and execute the sandboxes for large-scale workforce management platforms in accordance with one or more example embodiments of the present disclosure. The computing device 700 can include one or more attributes and/or capabilities of the computing device(s) in a workforce management platform (e.g., the platform 102, as discussed above with reference to FIG. 1), and/or the computing device(s)/system(s) therein. Furthermore, the computing device 700 can be configured to perform one or more operations and/or one or more actions that can be performed by the platform 102, and/or the computing device(s)/system(s) therein.

As shown in FIG. 7, the computing device 700 can include one or more memory devices 702, organizational data 703, rule data 704, organizational policy data 705, application policy data 706, integration data 707, data structures 708, one or more interconnects 712, one or more processors 720, a network interface 722, one or more mass storage devices 724, one or more output devices 726, one or more sensors 728, one or more input devices 730, and/or one or more location devices 732.

The one or more memory devices 702 can store information and/or data (e.g., organizational data 703, rule data 704, organizational policy data 705, application policy data 706, integration data 707, data structures 708, and/or any other types of data). Further, the one or more memory devices 702 can include one or more non-transitory computer-readable storage media, including RAM, ROM, EEPROM, EPROM, flash memory devices, magnetic disks, and any combination thereof. The information and/or data stored by the one or more memory devices 702 can be executed by the one or more processors 720 to cause the computing device 700 to perform one or more operations associated with performing multilayered generation and processing of computer instructions (e.g., in association with computer instructions in a custom query language) across various types of applications and/or computer systems, including, for example, receiving a request comprising one or more instructions in a first computer language, parsing the one or more instructions in the first computer language in view of one or more rules associated with the first computer language, analyzing the one or more instructions in the first computer language in view of information describing structure of a first application, generating one or more instructions in a second computer language different from the first computer language with the one or more instructions in the second computer language being generated based on the one or more instructions in the first computer language and the information describing structure of the first application, obtaining a result from a second application where the result comprises information based on the one or more instructions in the second computing language, and providing the result in response to the request comprising the one or more instructions in the first computer language.

The organizational data 703 can include one or more portions of data (e.g., the data associated with the platform 102, such as data associated with the sandbox 108 and/or the sandbox instance 112, which are depicted in FIG. 1) and/or instructions (e.g., instructions associated with the platform 102, such as data associated with the sandbox 108 and/or the sandbox instance 112). The organizational data 703 also can include information associated with one or more applications (e.g., one or more third-party applications), one or more organizational records and/or one or more organizational policies. In some embodiments, the organizational data 703 can be received from one or more computing systems (e.g., one or more computing systems in the platform 102, which can include the computing device(s) in the platform 102, depicted in FIG. 1, and/or one or more other computing systems) which can include one or more computing systems that are remote (e.g., in another room, building, part of town, city, or nation) from the computing device 700.

The rule data 704 can include one or more portions of data (e.g., the data associated with the platform 102, such as data associated with the sandbox 108 and/or the sandbox instance 112) and/or instructions (e.g., instructions associated with the platform 102, such as data associated with the sandbox 108 and/or the sandbox instance 112). The rule data 704 can include information associated with one or more rules that can be used to generate and/or implement an application policy. The rule data 704 also can include information associated with one or more rules of an organizational data management system (e.g., base or default rules provided or enforced by the system, one or more custom rules configured by an organization, etc.). The rule data 704 also can include one or more rules associated with implementing and/or utilizing a custom computer language, such as a custom computer language for performing operations associated with organizational data 703. In some embodiments, the rule data 704 can be received from one or more computing systems (e.g., the computing system(s) in the platform 102 and/or the other computing system(s)), which can include one or more computing systems that are remote from the computing device 700.

The organizational policy data 705 can include one or more portions of data (e.g., the data associated with the platform 102, such as data associated with the sandbox 108 and/or the sandbox instance 112) and/or instructions (e.g., instructions associated with the platform 102, such as data associated with the sandbox 108 and/or the sandbox instance 112). Furthermore, the organizational policy data 705 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 705 can be received from one or more computing systems (e.g., the computing system(s) in the platform 102 and/or the other computing system(s)) which can include one or more computing systems that are remote from the computing device 700.

The application policy data 706 can include one or more portions of data (e.g., the data associated with the platform 102, such as data associated with the sandbox 108 and/or the sandbox instance 112) and/or instructions (e.g., instructions associated with the platform 102, such as data associated with the sandbox 108 and/or the sandbox instance 112). Furthermore, the application policy data 706 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 706 can be received from one or more computing systems (e.g., the computing system(s) in the platform 102 and/or the other computing system(s)) which can include one or more computing systems that are remote from the computing device 700.

The integration data 707 can include one or more portions of data (e.g., the data associated with the platform 102, such as data associated with the sandbox 108 and/or the sandbox instance 112) and/or instructions (e.g., instructions associated with the platform 102, such as data associated with the sandbox 108 and/or the sandbox instance 112). The integration data 707 can include configuration and/or operational information associated with integrating and synchronizing data (e.g., organizational data 703) among one or more applications. For example, the integration data 707 can include information that enables integration and synchronization between each of one or more applications (e.g., third-party applications and/or other applications). In an embodiment, the integration data 707 provides integration information that allows an organizational data management system (e.g., a system of record for organizational data and organizational data processing), for example, to obtain information from one or more applications (e.g., third party and/or other applications), to perform operations involving organizational data (e.g., organizational data 703) in the organizational data management system, to synchronize organizational data across one or more applications, to perform one or more actions involving the applications based on organizational data in the organizational data management system, and/or to perform one or more other operations associated with managing organizational data as a system of record. In some embodiments, the integration data 707 can be received from one or more computing systems (e.g., the computing system(s) in the platform 102 and/or the other computing system(s)), which can include one or more computing systems that are remote from the computing device 700.

The data structures 708 can include one or more portions of data (e.g., the data associated with the platform 102, such as data associated with the sandbox 108 and/or the sandbox instance 112) and/or instructions (e.g., instructions associated with the platform 102, such as data associated with the sandbox 108 and/or the sandbox instance 112). The data structures 708 can include one or more logical and/or physical instances of information representing or describing one or more entities (e.g., objects, records, etc.), one or more relationships involving one or more of the entities, one or more data values associated with each of one or more of the entities and/or one or more of the relationships, one or more functions and/or operations that may be applied to each of one or more of the entities and/or one or more of the relationships, any other data or metadata describing or otherwise defining structure and/or rules associated with one or more of the entities and/or one or more of the relationships, etc.

The data structures 708 can be implemented and utilized with one or more types of computer software, computer hardware, or any combination thereof. In an embodiment, the data structures 708 are used to represent and perform processing associated with various types of organizational data (e.g., organizational data 703). For example, the data structures 708 may include information about various types of information and entities associated with organizational data including, but not limited to, individuals (e.g., employees, vendors, independent contractors), departments, teams, roles, groups, locations, offices, documents, tasks, reports, accounts, devices, applications, end-user applications, licenses, workflows, alerts, and/or any other types of entities representing or related to managing organizational data (e.g., organizational data 703).

The data structures 708 also can define various relationships among the various entities associated with organizational data. For example, the data structures 708 may define and be used to enforce relationships such as each employee must be assigned to a department, each employee can be included on one or more teams, each employee must be assigned to a primary location, each employee may be assigned to one or more secondary locations, employees may have one or more computing devices, each vendor must have a current audit, each independent contractor must be associated with a contract, and/or any other relationships provided by an organizational data management system or configured for an organization that utilizes an organizational data management system (e.g., a system for managing organizational data 703 based on one or more organizational data management applications).

In some embodiments, the data structures 708 can include one or more object graphs providing information about entities, relationships, and/or any other aspects relating to the definition, structure, and rules associated with organizational data (e.g., organizational data 703). The data structures 708 also can include any one or more other types of data structures (e.g., with or without the use of object graphs) that provide information about entities, relationships, and/or any other aspects of the definition, structure, and/or rules associated with organizational data. In some embodiments, the data structures 708 can be received from one or more computing systems (e.g., the computing system(s) in the platform 102 and/or the other computing system(s)), which can include one or more computing systems that are remote from the computing device 700.

The one or more interconnects 712 can include one or more interconnects or buses that can be used to send and/or receive one or more signals (e.g., electronic signals) and/or data (e.g., organizational data 703, rule data 704, organizational policy data 705, application policy data 706, integration data 707, data structures 708, and/or any other data, such as sandbox data 740, as discussed below in further detail) between components of the computing device 700, including the one or more memory devices 702, the one or more processors 720, the network interface 722, the one or more mass storage devices 724, the one or more output devices 726, the one or more sensors 728 (e.g., a sensor array), the one or more input devices 730, and/or the one or more location devices 732. The one or more interconnects 712 can be arranged or configured in different ways. For example, the one or more interconnects 712 can be configured as parallel or serial connections. Further the one or more interconnects 712 can include one or more internal buses that are used to connect the internal components of the computing device 700 and one or more external buses used to connect the internal components of the computing device 700 to one or more external devices. By way of example, the one or more interconnects 712 can include different interfaces including industry standard architecture (ISA), extended ISA, peripheral components interconnect (PCI), PCI Express, serial AT attachment (SATA), hypertransport (HT), universal serial bus (USB), thunderbolt, IEEE 1394 interface (FireWire), and/or other interfaces that can be used to connect components.

The one or more processors 720 can include one or more computer processors that are configured to execute the one or more instructions stored in the one or more memory devices 702. For example, the one or more processors 720 can, for example, include one or more general purpose central processing units (CPUs), ASICs, and/or one or more graphics processing units (GPUs). Further, the one or more processors 720 can perform one or more actions and/or operations including one or more actions and/or operations associated with the organizational data 703, the rule data 704, the organizational policy data 705, the application policy data 706, the integration data 707, the data structures 708, and/or any other data, such as the sandbox data 740. The one or more processors 720 can include single or multiple core devices including a microprocessor, microcontroller, integrated circuit, and/or a logic device.

The network interface 722 can support network communications. The network interface 722 can support communication via networks including a local area network and/or a wide area network (e.g., the internet). For example, the network interface 722 can allow the computing device 700 to communicate with the computing system 110 via the network 102.

The one or more mass storage devices 724 (e.g., a hard disk drive and/or a solid-state drive) can be used to store data including the data associated with the platform 102, such as data associated with the sandbox 108 and/or the sandbox instance 112, and/or any other data. The one or more output devices 726 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 728 can be configured to detect various states and can include one or more cameras, one or more light detection and ranging (LiDAR) devices, one or more sonar devices, and/or one or more radar devices. Further, the one or more sensors 728 can be used to provide input (e.g., an image of a user captured using the one or more cameras) that can be used as part of invoking or performing one or more operations. For example, the one or more sensors 728 can be used to authenticate the identity of a user and determine an authorization level based on an image of the user's face that is captured using the one or more sensors 728.

The one or more input devices 730 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 700).

Although the one or more memory devices 702 and the one or more mass storage devices 724 are depicted separately in FIG. 7, the one or more memory devices 702 and the one or more mass storage devices 724 can be regions within the same memory module. The computing device 700 can include one or more additional processors, memory devices, and/or network interfaces, which may be provided separately or on the same chip or board. The one or more memory devices 702 and the one or more mass storage devices 724 can include one or more computer-readable media, including, but not limited to, non-transitory computer-readable media, RAM, ROM, hard drives, flash drives, and/or other memory devices.

The one or more memory devices 702 can store sets of instructions for applications including an operating system that can be associated with various software applications or data. For example, the one or more memory devices 702 can store sets of instructions for one or more applications (e.g., one or more organizational applications and/or one or more third-party applications) that are subject to one or more application policies or utilize third-party integration data that can be configured, generated, and/or implemented by the computing device 700 and/or one or more other computing devices or one or more computing systems. In some embodiments, the one or more memory devices 702 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 700 can include applications associated with the data associated with the platform 102, such as data associated with the sandbox 108 and/or the sandbox instance 112. Further, the software applications that can be operated and/or executed by the computing device 700 can include native applications, web services, and/or web-based applications.

The one or more location devices 732 can include one or more devices or circuitry for determining the position of the computing device 700. For example, the one or more location devices 732 can determine an actual and/or relative position of the computing device 700 by using a satellite navigation positioning system (e.g. a global positioning system (GPS) system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

The sandbox data 740 can include the data associated with the sandbox 108 and/or the sandbox instance 112. In those or other examples, the sandbox data 740 can include data associated with any of the sandbox(es) 110, any combination thereof, any of the sandbox instance(s) 114, any combination thereof, or any other data associated with any other sandboxes and/or sandbox instances.

Figure 8:
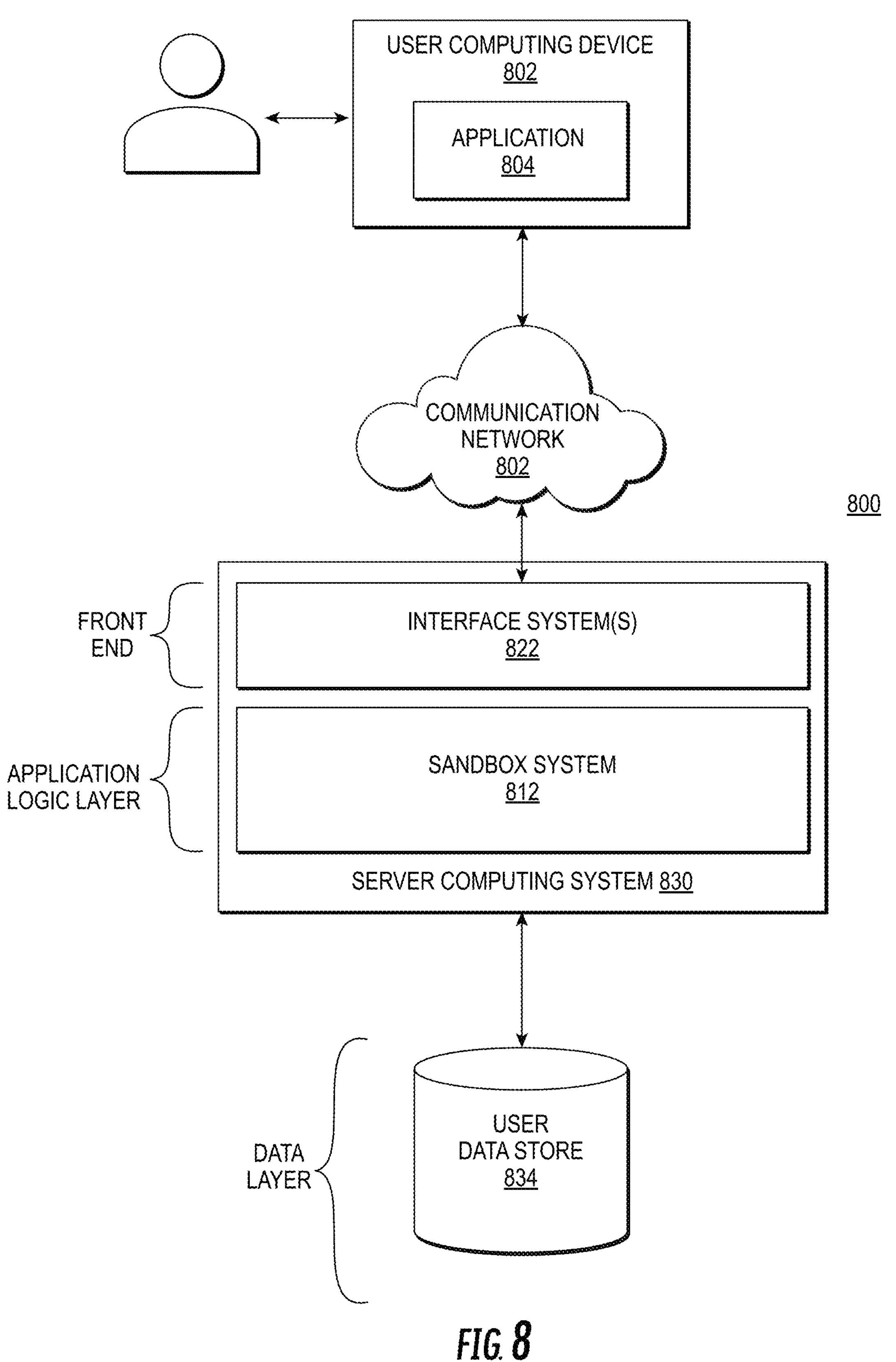
FIG. 8 depicts an example client-server environment according to example embodiments of the present disclosure.

FIG. 8 depicts an example client-server environment 800 according to example embodiments of the present disclosure. The client-server system environment 800 includes one or more user computing devices 802 and a server computing system 830. The server computing system 830 can be utilized to implement the platform 102, as discussed above with reference to FIG. 1. Individual ones of the computing device(s) 802 can be utilized to implement corresponding devices associated with one or more devices of the user(s) 136, as discussed above with reference to FIG. 1. One or more communication networks 820 can interconnect these components. The one or more communication networks 820 may be any of a variety of network types, including LANs, wide area networks (WANs), wireless networks, wired networks, the Internet, personal area networks (PANs), or a combination of such networks.

A user computing device 802 can include, but is not limited to, smartphones, smartwatches, fitness bands, navigation devices, laptop computers, desktop computers, tablet computers, and embedded computing devices (computing devices integrated into other objects, such as clothing, vehicles, or other objects). In some examples, a user computing device 802 can include one or more sensors intended to gather information with the permission of the user associated with the user computing device 802. The user computing device 802 can represent one or more computing devices associated with corresponding users among the user(s) 136.

In some examples, the user computing device 802 can include one or more application(s) 804 such as data access applications, search applications, communication applications, navigation applications, productivity applications, game applications, word processing applications, or any other applications. The application(s) can include a web browser. The application(s) can include one or more applications associated with, included in, and/or managed by, the user computing device 802. The application(s) 804 can interface with, and/or be controlled or managed by, any of the application 104 or the application(s) 106, or any combination thereof. The user computing device 802 can use a web browser (or other application) to send and receive requests to and from the server computing system 830. The application(s) can include a specific application for communicating with the server computing system 830. To do so, the application can receive input from a user. The input can be a selection of a request chat interface button, a typed question, or any other type of user input. The application can transmit the user input to the server computing system 830. The server computing system 830 can analyze the input and, if the input includes a user query, generate a response. The response can be transmitted to the user computing device 802 for display to the user.

As shown in FIG. 8, the server computing system 830 can be based on a three-tiered architecture, comprising a front-end layer, an application logic layer, and a data layer. As is understood by skilled artisans in the relevant computer and Internet-related arts, each component shown in FIG. 8 can represent a set of executable software instructions and the corresponding hardware (e.g., memory and processor) for executing the instructions. To avoid unnecessary detail, various components and engines that are not germane to conveying an understanding of the various examples have been omitted from FIG. 8. However, a skilled artisan will readily recognize that various additional components, systems, and applications may be used with the server computing system 830, such as that illustrated in FIG. 8, to facilitate additional functionality that is not specifically described herein. Furthermore, the various components depicted in FIG. 8 may reside on a single server computer or may be distributed across several server computers in various arrangements. Moreover, although the server computing system 830 is depicted in FIG. 8 as having a three-tiered architecture, the various example embodiments are by no means limited to this architecture.

As shown in FIG. 8, the front end can consist of an interface system(s) 822, which receives communications from one or more user computing devices 802 and communicates appropriate responses to the user computing devices 802. For example, the interface system(s) 822 may receive requests in the form of HTTP requests, or other web-based API requests. The user computing devices 802 may be executing conventional web browser applications or applications that have been developed for a specific platform to include any of a wide variety of computing devices and operating systems.

As shown in FIG. 8, the data layer can include a user data store 834. The user data store 834 can be utilized to implement one or more databases associated with the logical database 116, any of the logical database(s) 120, or any combination thereof, as discussed above with reference to FIG. 1. The data stored in the user data store 834 can be a variety of different types of data including but not limited to personal data (such as zip code, address, phone number and so on but only with the user's express permission), account activity data (login timestamps, session durations, number of visits), financial data (e.g., such as income amounts, tax amounts, purchase amounts, order IDs, payment amounts, and account balances), behavioral metrics (e.g., click-through rates, page views, and time spent on pages), performance-related data (e.g., such as game scores, fitness stats (e.g., steps taken or calories burned), and course progress percentages), preference data (e.g., preference ratings, numeric feedback like star reviews), and technical data (e.g., screen resolution or bandwidth usage for optimization.).

In some examples, the data store 834 can include rules that generate additional information (e.g., data values) using the stored values as underlying parameters. Thus, the data stored in the data store 834 can include raw data (e.g., data measured or received from a user) and generate values that use the raw data to calculate other values. This can be used to generate a plurality of values that have a hierarchical structure. One example of a hierarchical data structure is a tree (e.g., a trace tree and/or a logic tree). The child nodes of a node can be the values used to calculate it. A respective node's parent node is associated with the value calculated using the respective node.

In some examples, the data store 834 can store changes in these values (or in the rules) over time. Thus, the user can access a particular value for a particular month and compare it to the value at a previous month. For example, if the user wishes to know how much power their solar power system produced in the past, they can select 'history,' and the data explanation system will present historical values for the user to review. Using this historical information, the user can determine trends in the data associated with the current value and determine when specific underlying values changed.

The application logic layer can include application data that can provide a broad range of other applications and services that allow users to perform transactions or other purposes. The application logic layer can include a sandbox system 812.

The sandbox system 812 can represent any of various systems associated with the platform 102. The sandbox system 812 can include any of the computing device(s) and/or computing system(s) in the platform 102.

Figure 9:
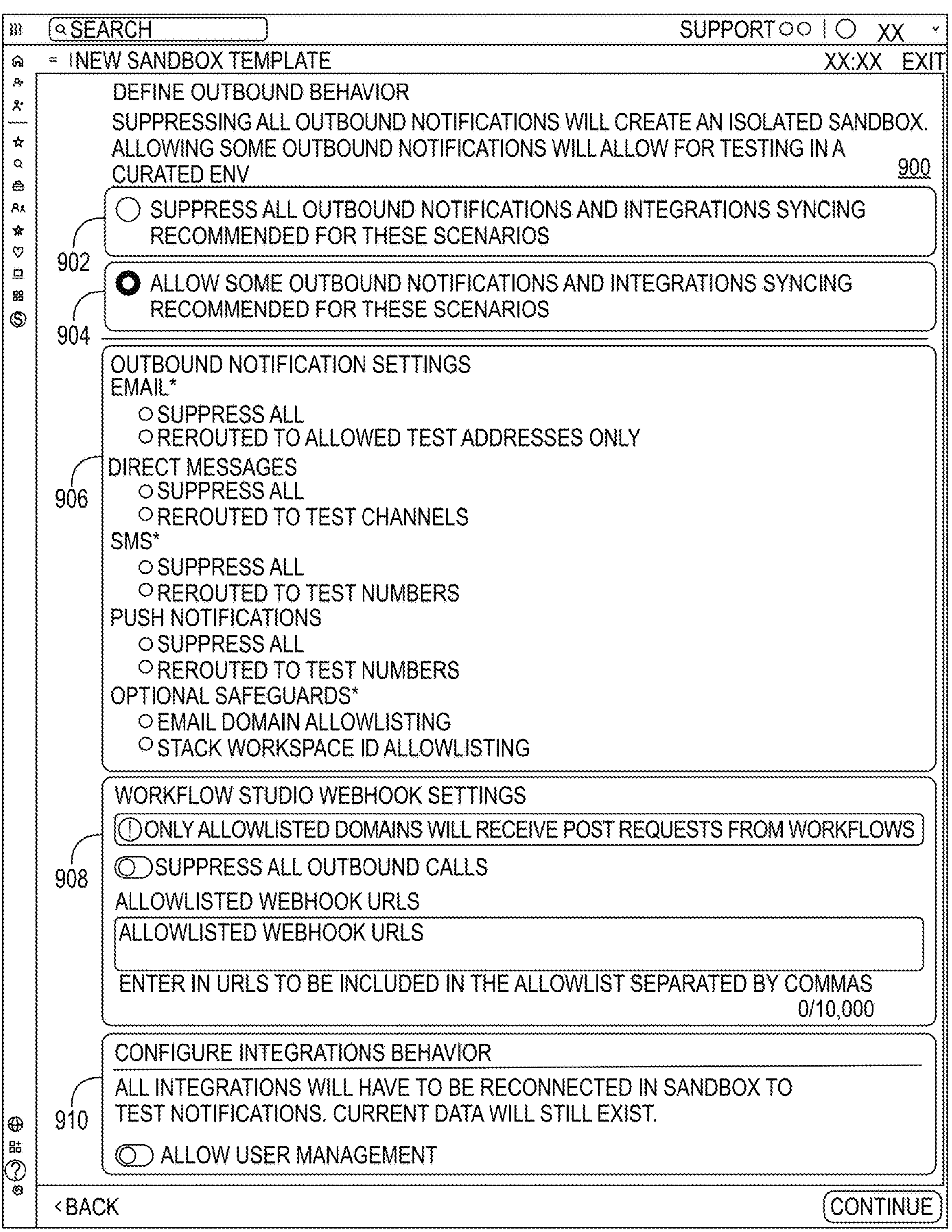
FIG. 9 depicts a screenshot utilized to control outbound behavior for a sandbox, according to example embodiments of the present disclosure.

FIG. 9 depicts a screenshot 900 utilized to control outbound behavior for a sandbox, according to example embodiments of the present disclosure. The screenshot 900 can be managed, for example, by a platform (e.g., the platform 102, as discussed above with reference to FIG. 1) utilized to generate a sandbox (e.g., the sandbox 108, as discussed above with reference to FIG. 1).

The screenshot 900 can be utilized to provide customer-defined domain allowlisting via a gateway (e.g., an egress gateway). In some examples, for instance, with HR workflows being integrated with third-party systems (e.g., cloud-based IAM services, ADP services, benefits providers, etc.), the screenshot 900 can be utilized to control outbound requests. For example, the screenshot 900 can be utilized to allow outbound requests only to the explicitly allowed domains, etc., based on one or more selections identified via user input to one or more devices (e.g., any of the computing device(s) 652, the user computing device 802, one or more other devices, etc., or any combination thereof).

In some examples, the screenshot 900 can be utilized to present content 902 with a selectable object utilized to suppress all outbound notifications, based on one or more selections identified via user input to one or more devices. The selectable object in the content 902 can include a radio button.

In some examples, the screenshot 900 can be utilized to present content 904 with a selectable object utilized to allow some outbound notifications. The selectable object in the content 904 can include a radio button alternately selectable with the radio button in the content 902, based on one or more selections identified via user input to one or more devices.

In some examples, the screenshot 900 can be utilized to present content 906 with selectable objects. The selectable objects in the content 906 can be utilized to control outbound notification settings with one or more radio buttons. The outbound notification settings can be controlled based on one or more selections identified via user input to one or more devices. For example, the outbound notification settings can be utilized, for emails, to suppress all email and/or reroute email to allocated test addresses only; for DMs, to suppress all DMs and/or reroute DMs to test channels; for SMS messages, to suppress all SMS messages and/or reroute SMS messages to test numbers; for push notifications, to suppress all push notifications and/or reroute push notifications to test numbers; for optional safeguards, to enable email domain allowlisting and/or enable DM workspace ID allowlisting, etc., or any combination thereof.

In some examples, the screenshot 900 can be utilized to present content 908 with selectable objects. The selectable objects in the content 908 can be utilized to suppress, with a toggle button, outbound calls (e.g., all outbound calls). Such suppression can control workflow studio webhook settings so that only allowlisted domains are enabled to receive requests (e.g., HTTP POST requests) from workflows.

In some examples, the screenshot 900 can be utilized to present content 910 with a selectable object. The selectable object in the content 910 can be utilized to allow, with a toggle button, user management for configuring integrations behavior. Allowing user management can be enabled so that all integrations will have to be reconnected in the sandbox 108 to test notifications. In some cases, current data will still exist based on user management being allowed.

While various UI objects (e.g., radio and/or toggle buttons) can be utilized to manage outbound behavior, as discussed above in the current disclosure. However, any of one or more types of UI objects can be utilized to manage any of one or more portions of the behavior, the objects including buttons (e.g., to trigger actions or navigate to different sections), text fields/input fields (e.g., to allow users to enter single-line text, text areas/text editors (e.g., to allow users to enter multi-line text), checkboxes (e.g., to allow users to select multiple options from a list, radio buttons (e.g., to allow users to select a single option from a group), dropdown menus/selects (e.g., to provide a list of options from which the user can choose one), sliders (e.g., to allow users to select a value within a range), toggles/switches (e.g., to control on/off states or enable/disable features), date pickers/calendars (e.g., to facilitate the selection of dates and/or times), file uploaders (e.g., to provide an interface for users to upload files), search bars (e.g., to input fields specifically for searching content), etc., or any combination thereof.

FIG. 10 depicts a screenshot 1000 utilized to control sandbox templates, according to example embodiments of the present disclosure. The screenshot 1000 can be utilized to control templates associated with creation of sandboxes, such as a sandbox (e.g., the sandbox 108, as discussed above with reference to FIG. 1) managed by a platform (e.g., the platform 102, as discussed above with reference to FIG. 1).

The screenshot 1000 can be utilized to present content 1002 that includes templates and/or is associated with different templates. The content 10002 can include template names (e.g., testcases, QA, Dev_test, sandbox_template, staging, Data template, release, etc.), descriptions (e.g., isolated environment . . . , dedicated testing environment . . . , developer-focused sandbox . . . , use for various cases . . . , mirror production environment . . . , pre-configured data environment . . . , production-like environment . . . , etc.,), outbound testing statuses/types (e.g., isolated, connected, etc.), application statuses/types (e.g., partial copy, full copy, etc.), employee data statuses/types (e.g., scrambled data, no data, full data, etc.), created by names, created on dates/times, etc., or any combination thereof. The templates can be utilized to generate a sandbox (e.g., the sandbox 108, as discussed above with reference to FIG. 1).

Various types of templates can be utilized to create various types of sandboxes. Any of the sandboxes (e.g., created via the various templates, etc.) may be utilized to implement, and/or may be implemented by, the sandbox 108. In some examples, the templates can include a template for creating full-clone connected sandboxes (e.g., as represented/selectable by the application status/type of full copy and the outbound testing status/type of connected). The full-clone connected sandboxes can be utilized to enable end to end validation of workflow studio logic in a controlled setting. The controlled setting may include a setting where only explicitly allowed listed destinations receive messages. The full-clone connected sandboxes can be utilized to enable end to end validation outbound notifications in the controlled setting.

In those or other examples, the templates can include a template for creating full-clone isolated sandboxes (e.g., as represented/selectable by the application status/type of full copy and the outbound testing status/type of isolated). The full-clone isolated sandboxes can deliver a risk free, production fidelity playground so administrators and/or partners can experiment with configurations. Alternatively or additionally, the administrators and/or partners can utilize the risk free, production fidelity playground delivered by the full-clone isolated sandboxes to experiment workflows without any chance of leaking data and/or triggering external systems.

In those or other examples, the templates can include a template for creating a partial data sandbox (e.g., as represented/selectable by the application status/type of partial copy). The partial data sandbox can be utilized to create user acceptance testing (UAT) environments that include a representative slice of production data.

In those or other examples, the templates can include a template for creating a metadata sandbox and/or a no data sandbox (e.g., as represented/selectable, with respect to the no data sandbox, by the employee data status/type of no data). The metadata and/or no data sandbox can provide a relatively lightweight and/or relatively fast provisioning sandbox. The metadata and/or no data sandbox can enable developers to build and/or test content (e.g., such as by using continuous integration/continuous delivery (CI/CD) pipelines) using metadata associated with the platform 102 without exposing real employee data.

In those or other examples, the templates can include a template for creating a developer sandbox that is not for employees (e.g., as represented/selectable by the employee data status/type of no data). The developer sandbox can provide a relatively lightweight and/or relatively fast provisioning sandbox for developers to build and/or test content (e.g., such as by using CI/CD pipelines) using on metadata associated with the platform 102 without exposing real employee data.

In those or other examples, the templates can include a template for creating a scrambled sandbox and/or a dummy data sandbox (e.g., as represented/selectable, with respect to the scrambled sandbox, by the employee data status/type of scrambled data). The scrambled sandbox and/or the dummy data sandbox can facilitate integration and/or UI testing that still needs realistic user records. The facilitating of the integration and/or UI testing (e.g., that still needs realistic user records) can include offering privacy safe dummy/scrambled data, bridging the gap between the metadata only sandbox and the full clone sandbox.

Figure 11:
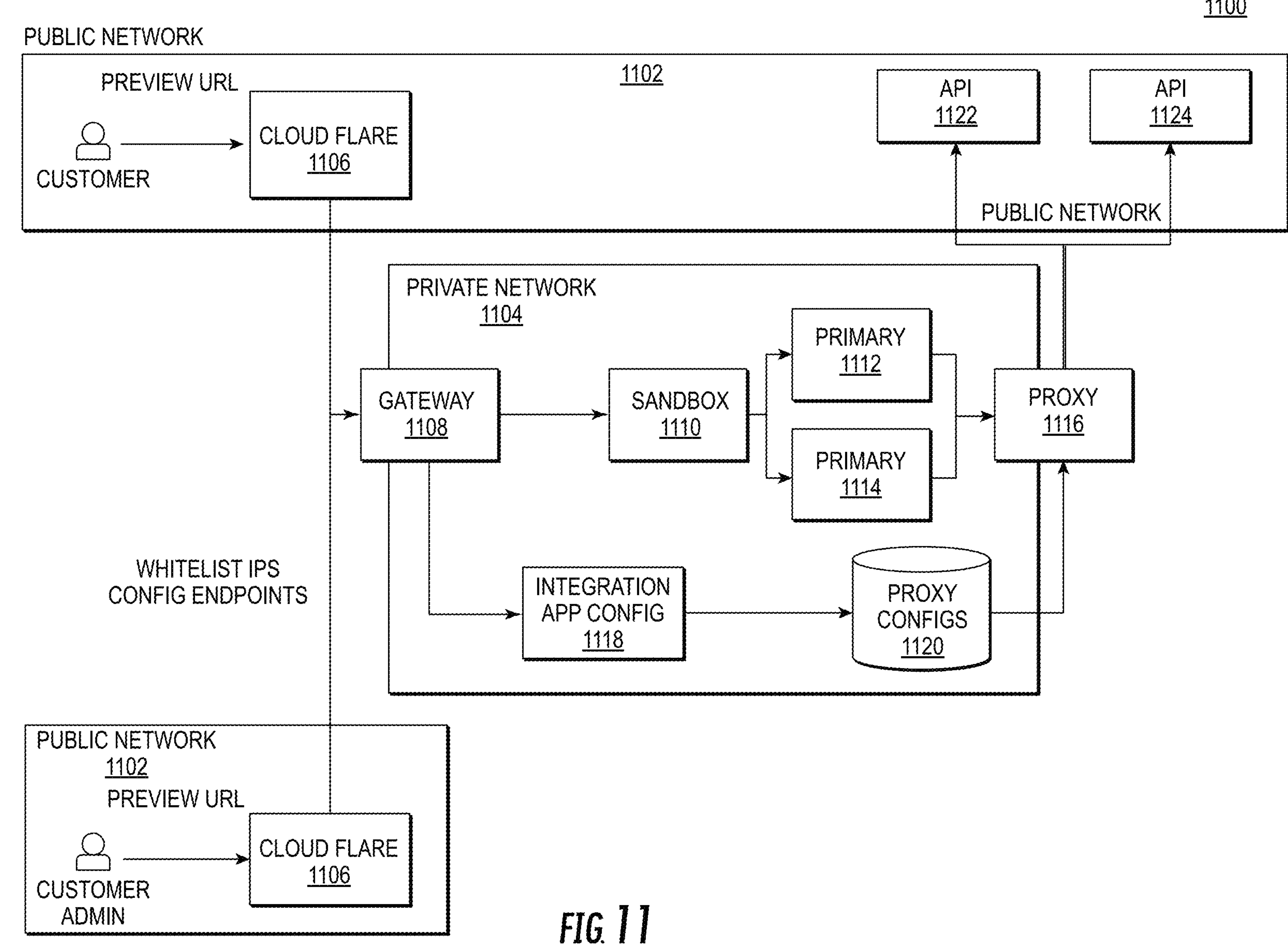
FIG. 11 depicts a block diagram of an example environment for preventing sandbox externalities, according to example embodiments of the present disclosure.

FIG. 11 depicts a block diagram of an example environment 1100 for preventing sandbox externalities, according to example embodiments of the present disclosure. The environment 1100 can be utilized to manage a platform (e.g., the platform 102, as discussed above with reference to FIG. 1) and/or a sandbox (the sandbox 108, as discussed above with reference to FIG. 1), utilizing a public network 1102 (e.g., such as the internet) and a private network 1204.

The public network 1102 can include a network 1106 associated with a customer and/or a customer administrator. The network 1106 can include one or more devices of the customer and/or the customer administrator. The network 1106 can enable users to connect to applications securely, and/or to provide network security for devices of organization members. The network 1106 can be accessed, for example, via a preview URL.

The private network 1204 can include, and/or be utilized to manage, a gateway 1108. The gateway 1108 can perform operations based on content output from one or more customer devices and/or one or more customer administrator devices, via the network 1106. The gateway 1108 can perform operations based on whitelist internet protocols (IPs) utilized to configure endpoints for the customer administrator, via the network 1106. The IPs can be output by the customer administrator device(s), via the network 1106.

The private network 1204 can include, and/or be utilized to manage, a sandbox 1110 (e.g., the sandbox 108), The gateway 1108 can be utilized to communicatively couple the network 1106 and the sandbox 1110.

The private network 1204 can include, and/or be utilized to manage various primary applications of any number and/or type (e.g., the primary application 302, as discussed above with reference to FIG. 3). The primary applications can include a primary application (or "primary") 1112 and a primary application (or "primary") 1114, with which the sandbox 1110 may be associated.

The private network 1204 can be communicatively coupled to, and/or can operate utilizing, a proxy 1116. The gateway 1108 and the proxy 1116 can be utilized to manage the sandbox 1110 and/or the primary application(s) 1112/1114.

The private network 1204 can include, and/or be utilized to manage an integration application configuration manager 1118 and/or a proxy configuration manager 1120. The application configuration manager 1118 can be utilized to manage configurations associated with the primary application(s) 1112/1114. The proxy configuration manager 1120 can be utilized to manage configurations associated with the proxy 1116. The gateway 1108 and the proxy 1116 can be utilized to manage the sandbox 1110 and the primary application(s) 1112/1114, based on the integration application configuration manager 1118 and/or the proxy configuration manager 1120.

The proxy 1116 can be utilized to control traffic. A set of domains can be identified based on requests from the customer administrator (e.g., the customer sandbox administrator). The proxy 1116 can be utilized to block traffic based on the domains.

The public network 1102 can be utilized to manage one or more APIs, such as an API 1122 (e.g., associated with search) and an API 1124 (e.g., associated with video communications). The proxy 1116 can be utilized to control traffic between the private network 1104 (e.g., the sandbox 1110) and the public network 1102 (e.g., the API(s) 1122/1124).

Figure 12:
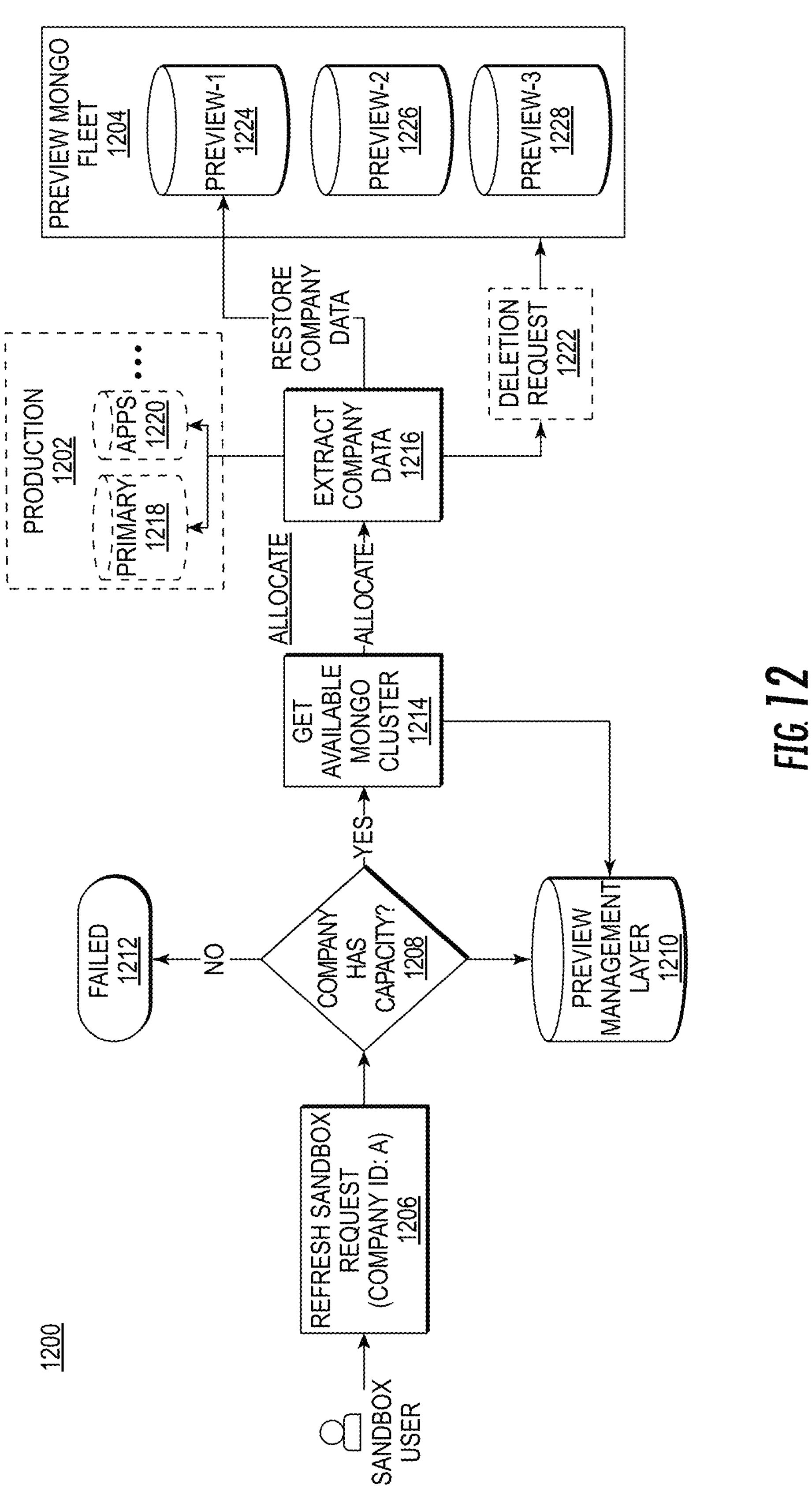
FIG. 12 depicts a block diagram of an example environment for performing a sandbox refresh, according to example embodiments of the present disclosure.

FIG. 12 depicts a block diagram of an example environment 1200 for performing a sandbox refresh, according to example embodiments of the present disclosure. The environment 1200 can be utilized to perform the sandbox refresh, utilizing a production environment 1202 (e.g., the production environment 402, as discussed above with reference to FIG. 4) and a preview mongo fleet 1204 associated with a preview environment (e.g., the preview environment 404, as discussed above with reference to FIG. 4).

The environment 1200 can be utilized to manage the sandbox refresh for a sandbox user (e.g., a customer). The refresh can be performed based on a request from the user (e.g., any of the user(s) 136, as discussed above with reference to FIG. 1). The request can be processed to identify whether the request is to perform the refresh. The request being received to perform the refresh may include a refresh sandbox request 1206, which can include a company ID (e.g., company ID A). The refresh sandbox request 1206 can be processed to refresh the sandbox for a company (e.g., associated with the company ID A) based on whether the company has capacity 1208.

The environment 1200 can be utilized to manage the sandbox refresh based on a preview management layer 1210. The preview management layer 1210 can be utilized to process the request 1206, such as by identifying content associated with the refresh, and/or content to be utilized to perform the refresh.

The environment 1200 can be utilized to manage the sandbox refresh based on the refresh having failed 1212. The refresh having failed 1212 can be processed in various ways and/or with various states. The environment 1220 can be utilized to perform (e.g., reperform), and/or return to performing, the extract sandbox request 1206 utilizing one or more new requests, based on the refresh having failed 1212.

The environment 1200 can be utilized to manage the sandbox refresh, based on the refresh sandbox request 1206, and confirming the company having capacity 1208 verification is satisfied, and further based on a get available mongo cluster task (also referred to herein simply as "get available mongo cluster") 1214. The get available mongo cluster 1214 can be utilized to identify a mongo cluster that is then provided to the preview management layer 1210.

The environment 1200 can be utilized to manage the sandbox refresh based on the mongo cluster being identified and obtained, to perform an extract company data task (also referred to herein simply as "extract company data") 1216. The extract company data task 1216 can be performed to identify company data from a primary application (e.g., a core application) 1218 (e.g., the primary application 320, as discussed above with reference to FIG. 3A) and/or applications 1220 (e.g., the application 104, as discussed above with reference to FIG. 1, one or more other applications, or any combination thereof). Content, such as various types of data, extracted from the primary application 1218 can include content associated with an HR company, a job, a user, etc., or any combination thereof. Content, such as various types of data, extracted from the applications 1220 can include content associated with a logical grouping (e.g., of related custom actions, subflows, supporting application files, etc., or any combination hereof) associated with the application, application configurations, etc., or any combination thereof.

The company data extracted via the extract company data 1216 can be provided to the preview mongo fleet 1204 to delete company data and/or to restore company data. Company data can be deleted based on a delete request 1222 received based on performing the extract company data 1216. Alternatively or additionally, the preview mongo fleet 1204 can restore company data, such as data associated with a preview instance (or "preview-1") 1224, a preview instance (or "preview-2") 1226. Data associated with the preview-1 instance 1224, a preview instance (or "preview-3") 1228, and/or one or more other preview instances can be restored, deleted, etc. For instance, the preview mongo fleet 1204 can delete company data, such as data associated with the preview instance (or "preview-2") 1228.

Preview instances can manage the content associated with the primary application 1218 and the applications 1220. For example, individual ones of the preview instances 1224, 1226, and 1228 can include content, such as the HR company, the job, the user, etc., associated with the primary application 1218. In such an example or another example, individual ones of the preview instances 1224, 1226, and 1228 can include content, such as the logical grouping, the configurations, etc., associated with the applications 1220.

By way of example, the sandbox restore can be performed when provisioning a customer sandbox (e.g., the sandbox 108). The data to provision the sandbox 108 can be extracted from the environment production 1202 and restored to a new isolated environment. Customers can also choose to perform data refreshes for their provisioned sandboxes. Service level agreements (SLAs) (e.g., strict SLAs) for provisioning sandboxes within threshold time periods (e.g., less than 6 hours) can be utilized by customers. The SLAs can be supported by the platform 102. In some cases, the sandbox restore can be utilized to implement the restoring 224, as discussed above with reference to FIG. 2.

The platform 102 can be utilized to provision the sandbox 108, based on various capabilities of the platform 102. The capabilities of the platform 102 can include a capability to provision the sandbox 108 using a company's data that is present in several databases and/or systems. The capabilities of the platform 102 can include a capability to provision the sandbox 108 using data that is maintained with referential integrity. For instance, an association between an employee and a company can be maintained.

The capabilities of the platform 102 can include uniqueness constraints (e.g., a constraint in which work emails remain unique) inside of the platform 102. In contrast to provisioning performed for simple sandboxes by existing systems, the platform 102 can provision various sandboxes (e.g., N sandboxes) for the company while maintaining the uniqueness constraints. Certain data (e.g. API keys) can be obfuscated to prevent accidental third party externalities.

Data for a company being extracted can include all data for the company, so that product behavior remains consistent. Data and/or configurations (e.g., as appropriate and/or required) utilized to provision the sandboxes can be shared across companies to enable operation and/or utilizing of the sandboxes (e.g., to enable integrations to be available for installation).

Various copies (e.g., hundreds of copies) of a customer's data can be extracted and/or restored for various sandboxes. The copies of the customer's data can be extracted and/or restored for isolation for each customer sandbox. For instance, isolation can be provided by extracting data from the production environment 1202 for a given company.

Data can be extracted via a batch extract task to extract data from the production environment 1202. This process can extract data for the company from all production databases. Extracted data for the company from all production databases can enable a relatively high level of customizability and configurability. The extraction of the data can be performed based on a list of collections to exclude, a list of collections to always extract, a list of collections to extract all the data from (e.g., non-company specific collections), custom filtering actions for specific collections, and/or processes utilized to transform the data during extraction. These processes can be used to obfuscate and/or scrub data for specialized use cases of the customer sandbox.

Output of the extraction of the data can include a content dump (e.g., a dump from a cloud object storage container, utilized to store files, data, etc., or any combination thereof). The content dump can include all extracted data for a given company in a flattened folder structure.

The existing customer sandbox can be reset to an empty state. The sandbox being reset can be performed by a reset customer sandbox function. For example, for a given sandbox (e.g., the sandbox 108), this process can drop all existing data and convert the sandbox into an empty sandbox, ready to be loaded with the latest data. This process can support multiple custom hooks that can be sequentially executed to clean up the existing data. Some of these hooks can include dropping old databases, dropping indexes (e.g., indexes associated with a service utilized to organize and store data, indexes associated with a database including log entries, user profiles, etc.), and so on, or any combination thereof. Output of dropping the data can include an empty sandbox ready to be restored with data.

The empty customer sandbox can be restored with all data. The sandbox can be restored with a restore customer sandbox function (e.g., the restoring 224). This can be performed via custom data model restore parameters, which can include various details, such as a URL (e.g., utilized to access the indexes) for the data sources. The details can include company details to be restored. The details can include SSO-related URLs for authentication and login. The details can include custom configurations for the platform 102 to be able to support customers in case they require assistance. The details can include additional metadata.

The restoring of the data can be performed to restore the entire company data into a single logical database for isolation. The logical database can support multiple custom mechanisms (e.g., hooks) which can be utilized for post-processing on the restored data. The mechanisms can allow custom logic to be executed at specific points during database operations and/or lifecycle events. The custom hooks can include building any missing database indexes; removing any null references in the database to maintain data integrity; updating settings for allowing customers to log in to sandboxes using SSOs; initializing global settings and configurations for the sandbox 108; setting up the platform 102 as a side car to support customers in case they face issues, initialize search functionality and data for the sandbox, and/or to set up login-as functionality for the sandbox 108, and/or one or more other hooks. Output of the restoring can include the customer sandbox in the ready state that can be used by customers.

Checkpointing can be performed after each action is completed. Checkpointing can provide checks for the actions to prevent errors that may otherwise occur due to the complexity of the data being managed. Checkpointing can provide checks for the actions to prevent errors that may otherwise occur to prevent delays and failures. This database level checkpointing can be performed to keep track of the completed actions. The checkpointing can be performed to restore the sandboxes in case of failure (e.g., which can be intermittent and/or systemic), and/or to resume the restoring processes, such as by using recurring/ad hoc executions of a "healing" task.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing," "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:

one or more processors;

a data store storing one or more logical databases with user data;

one or more non-transitory computer-readable media that collectively perform one or more operations, comprising:

establishing a sandbox of a workforce management platform and a logical database for a sandbox instance of the sandbox;

managing objects in the logical database of the sandbox using metadata associated with a corresponding cluster, the logical database isolating the sandbox from one or more other sandboxes;

managing permissioned access to the objects, based on relative assignments of users in an organization;

generating and executing the sandbox instance of the sandbox using the managed objects and the managed permissioned access; and performing an action using the sandbox instance based on a command and a user profile of a user of the organization, the command being associated with the user and provided based on customer input from a customer.

2. The computing system of claim 1, wherein the one or more operations comprise:

dynamically managing the objects and the permissioned access with a sandbox orchestrator using a plurality of sandbox modes in a preview environment by:

dynamically performing the managing of the objects in the sandbox instance with the sandbox orchestrator in a test mode; and dynamically performing the managing of the permissioned access to the objects with the sandbox orchestrator in the test mode.

3. The computing system of claim 1, wherein the one or more operations comprise:

receiving, from a customer device and via customer input to the customer device, a request comprising an identifier utilized to select the sandbox instance and a login-as value utilized to select the user profile, and wherein performing the action comprises denying the command based on the customer being logged in as the user and a permission of the user not satisfying a requirement to perform the command.

4. The computing system of claim 1, wherein the one or more operations comprise:

receiving, from an administrator device, a request to set a permission associated with a folder of the user; and updating the sandbox instance by setting the permission associated with the folder and sharing the permission to each of a plurality of files in the folder, wherein the command comprises a request to access a file in the folder, and a permission associated with the file is set in response to the sharing of the permission associated with the folder, and wherein performing the action comprises granting the request based on a permission assigned to the user satisfying the permission associated with the file.

5. The computing system of claim 1, wherein the one or more operations comprise:

receiving, from a customer device and via customer input to the customer device, a first request comprising a first identifier utilized to select the sandbox instance as a first sandbox instance with a first cluster; and receiving, from the customer device and via customer input to the customer device, a second request comprising a second identifier utilized to select a second sandbox instance associated with a second cluster physically isolated from the first cluster, wherein the first sandbox instance and the second sandbox instance are logically isolated from one another, wherein the first sandbox instance and the second sandbox instance are both associated with a base preview cluster, and wherein the base preview cluster comprises collection and configuration data associated with a plurality of clusters but does not comprise customer data.

6. The computing system of claim 1, wherein the logical database comprises a plurality of collections of data from a plurality of different sources associated with a plurality of different databases in the workforce management platform.

7. The computing system of claim 1, wherein the one or more operations comprise:

receiving, from a customer device, a request associated with testing a third-party application and the workforce management platform using the sandbox instance; and performing another action using the third-party application and the workforce management platform with the sandbox instance, and wherein data in the logical database being modified by the performing of the other action is isolated from other data in other logical databases associated with other sandboxes in the workforce management platform.

8. The computing system of claim 1, wherein the one or more operations comprise:

blocking communications to third-party systems by auditing traffic using a network proxy and one or more domain allowlists, the network proxy being coupled between the computing system and the third-party systems.

9. The computing system of claim 1 wherein the one or more operations comprise:

storing, in a preview instance model, a unique identifier of the sandbox instance; and storing, in the preview instance model, a status of the sandbox instance.

10. The computing system of claim 1, wherein the one or more operations comprise:

managing a sandbox orchestrator by:

provisioning the sandbox instance as a new instance using the sandbox orchestrator in a provisioning state;

identifying using the sandbox orchestrator in a provisioning failed state that the provisioning of the sandbox instance as the new instance failed; and retrying the provisioning of the sandbox instance as the new instance using the sandbox orchestrator to proceed to a provisioned empty state.

11. The computing system of claim 1, wherein the one or more operations comprise:

managing a sandbox orchestrator by:

based on the sandbox orchestrator being a provisioned empty state, resetting the sandbox instance using the sandbox orchestrator in a resetting state;

identifying using the sandbox orchestrator in a reset failed state that the resetting of the sandbox instance failed;

retrying the resetting of the sandbox instance using the sandbox orchestrator to proceed to a restoring state;

restoring the sandbox instance using the sandbox orchestrator in the restoring state;

identifying using the sandbox orchestrator in a restore failed state that the restoring of the sandbox instance failed; and retrying the resetting and the restoring of the sandbox instance using the sandbox orchestrator to proceed to a ready state.

12. A computer-implemented method, comprising:

establishing a sandbox of a workforce management platform and a logical database for a sandbox instance of the sandbox;

managing objects in the logical database of the sandbox using metadata associated with a corresponding cluster, the logical database isolating the sandbox from one or more other sandboxes;

managing permissioned access to the objects, based on relative assignments of users in an organization;

generating and executing the sandbox instance of the sandbox using the managed objects and the managed permissioned access; and performing an action using the sandbox instance based on a command and a user profile of a user of the organization, the command being associated with the user and provided based on customer input from a customer.

13. The computer-implemented method of claim 12, further comprising:

blocking outbound network traffic associated with the sandbox instance by default, by using a network proxy to selectively permit traffic using the sandbox instance according to a pre-approved list of domains.

14. The computer-implemented method of claim 12, wherein the command comprises a login-as command received from the customer, the customer comprising an administrator of the workforce management platform, further comprising:

identifying whether to grant within the sandbox a login to the administrator as another employee of the organization, wherein the login enables the administrator to directly view how system changes associated with permissions will appear to the other employee during operation of the workforce management platform.

15. The computer-implemented method of claim 12, further comprising:

automatically rerouting one or more notifications from among notifications generated by workflows within the sandbox, the notifications comprising at least one of emails or messaging service messages, the one or more notifications being automatically rerouted to a testing channel accessible by an administrator of the workforce management platform.

16. The computer-implemented method of claim 12, further comprising:

registering one or more aliases from among a plurality of aliases associated with the workforce management platform, the one or more aliases not being previously registered at startup along with remaining aliases of the plurality of aliases, the one or more aliases being dynamically registered for the sandbox instance on-demand based on a request for the sandbox instance being received.

17. One or more non-transitory computer readable media configured to generate multiple sandbox instances per individual customer, the one or more non-transitory computer readable media storing instructions that are executable by one or more processors to perform one or more operations comprising:

establishing a sandbox of a workforce management platform and a logical database for a sandbox instance of the sandbox;

managing objects in the logical database of the sandbox using metadata associated with a corresponding cluster, the logical database isolating the sandbox from one or more other sandboxes;

managing permissioned access to the objects, based on relative assignments of users in an organization;

generating and executing the sandbox instance of the sandbox using the managed objects and the managed permissioned access; and performing an action using the sandbox instance based on a command and a user profile of a user of the organization, the command being associated with the user and provided based on customer input from a customer.

18. The one or more non-transitory computer readable media of claim 17, wherein the one or more operations comprise:

dynamically managing the objects and the permissioned access with a sandbox orchestrator using a plurality of sandbox modes in a preview environment by:

dynamically performing the managing of the objects in the sandbox instance with the sandbox orchestrator in a test mode; and dynamically performing the managing of the permissioned access to the objects with the sandbox orchestrator in the test mode.

19. The one or more non-transitory computer readable media of claim 17, wherein data associated with the organization is captured from multiple different sources and collections and flattened into a single logical database, and wherein the single logical database is used to provide isolation between the sandbox instance and remaining sandbox instances associated with the sandbox or other sandboxes.

20. The one or more non-transitory computer readable media of claim 17, wherein the action comprises a multistep workflow from among a plurality of multistep workflows, and wherein the plurality of multistep workflows comprising a hiring and onboarding flow, and offboarding flow, and an open enrollment configurations flow.

* * * * *